(12) United States Patent
Przestrzelski

(10) Patent No.: US 11,513,935 B2
(45) Date of Patent: Nov. 29, 2022

(54) SYSTEM AND METHOD FOR DETECTING ANOMALIES BY DISCOVERING SEQUENCES IN LOG ENTRIES

(71) Applicant: DELL PRODUCTS, LP, Round Rock, TX (US)

(72) Inventor: Piotr Przestrzelski, Cork (IE)

(73) Assignee: Dell Products L.P., Round Rock, TX (US)

(*) Notice: Subject to any disclaimer, the term of this patent is extended or adjusted under 35 U.S.C. 154(b) by 95 days.

(21) Appl. No.: 16/556,982

(22) Filed: Aug. 30, 2019

(65) Prior Publication Data
US 2021/0064500 A1 Mar. 4, 2021

(51) Int. Cl.
G06F 11/00 (2006.01)
G06F 11/30 (2006.01)
G06F 11/07 (2006.01)
G06F 11/34 (2006.01)

(52) U.S. Cl.
CPC ...... *G06F 11/3075* (2013.01); *G06F 11/0703* (2013.01); *G06F 11/079* (2013.01); *G06F 11/0751* (2013.01); *G06F 11/0757* (2013.01); *G06F 11/0769* (2013.01); *G06F 11/0778* (2013.01); *G06F 11/3086* (2013.01); *G06F 11/3476* (2013.01)

(58) Field of Classification Search
CPC .......... G06F 11/3075; G06F 11/0757; G06F 11/0769; G06F 11/3086; G06F 11/0751; G06F 11/0754; G06F 11/0766; G06F 11/0778; G06F 11/0781; G06F 11/079; G06F 11/3065; G06F 11/3072; G06F 11/3476
See application file for complete search history.

(56) References Cited

U.S. PATENT DOCUMENTS

| | | | |
|---|---|---|---|
| 7,774,521 B2 | 8/2010 | Gupta et al. | |
| 10,489,229 B2 * | 11/2019 | Mustafi | G06F 11/076 |
| 10,685,044 B2 * | 6/2020 | Miranda | G06F 16/2358 |
| 2014/0344622 A1 * | 11/2014 | Huang | G06F 11/0775 714/37 |
| 2017/0102919 A1 * | 4/2017 | Karppanen | G06F 5/065 |
| 2018/0300202 A1 | 10/2018 | Lambert et al. | |
| 2020/0021511 A1 * | 1/2020 | Xu | H04L 41/069 |
| 2020/0169575 A1 * | 5/2020 | Myers | G06F 17/11 |

OTHER PUBLICATIONS

Hu, Ya-Han, Tony Cheng-Kui Huang, Hui-Ru Yang, and Yen-Liang Chen. "On mining multi-time-interval sequential patterns." Data & Knowledge Engineering 68, No. 10 (2009): pp. 1112-1127. (Year: 2009).*

(Continued)

*Primary Examiner* — Anthony J Amoroso
(74) *Attorney, Agent, or Firm* — Larson Newman, LLP

(57) ABSTRACT

A method for detecting an anomaly includes retrieving a log file that includes log entries, grouping the log entries into clusters of log entry types based on number of occurrences and average time interval, and discovering a sequence of the log entry types within each of the clusters. The sequence of the log entry types is based on a shortest path from a first one of the log entry types to a last one of the log entry types.

17 Claims, 14 Drawing Sheets

(56) References Cited

OTHER PUBLICATIONS

Debnath, B., Solaimani, M., Gulzar, M.A.G., Arora, N., Lumezanu, C., Xu, J., Zong, B., Zhang, H., Jiang, G. and Khan, L., Jul. 2018. Loglens: A real-time log analysis system. In 2018 IEEE 38th International Conference on Distributed Computing Systems (ICDCS) (pp. 1052-1062). IEEE. (Year: 2018).*

Liu, Zhaoli, Tao Qin, Xiaohong Guan, Hezhi Jiang, and Chenxu Wang. "An integrated method for anomaly detection from massive system logs." IEEE Access 6 (2018): pp. 30602-30611. (Year: 2018).*

"Experience Report: System Log Analysis for Anomaly Detection," Shilin He, 2016 IEEE 27th International Symposium an Software Reliability Engineering, 2332-6549/16; pp. 207-218; https://ieeexplore.ieee.org/document/7774521.

"Log Clustering based Problem Identification for Online Service Systems," Qingwei Lin, ICSE '16 Companion, May 14-22, 2016, Austin, TX, USA; pp. 1-10, https://www.microsoft.com/en-us/research/wp-content/uploads/2016/07/ICSE-2016-2-Log-Clustering-based-Problem-ldentification-for-Online-Service-Systems.pdf.

"LogMaster: Mining Event Correlations in Logs of Large-scale Cluster Systems," Xiaoyu Fu, 2012 31st International Symposium on Reliable Distributed Systems; 1060-9857/12; pp. 71-80; https://www.computer.org/csdl/proceedings-article/srds/2012/4784a071/12OmNBU 1jJc.

\* cited by examiner

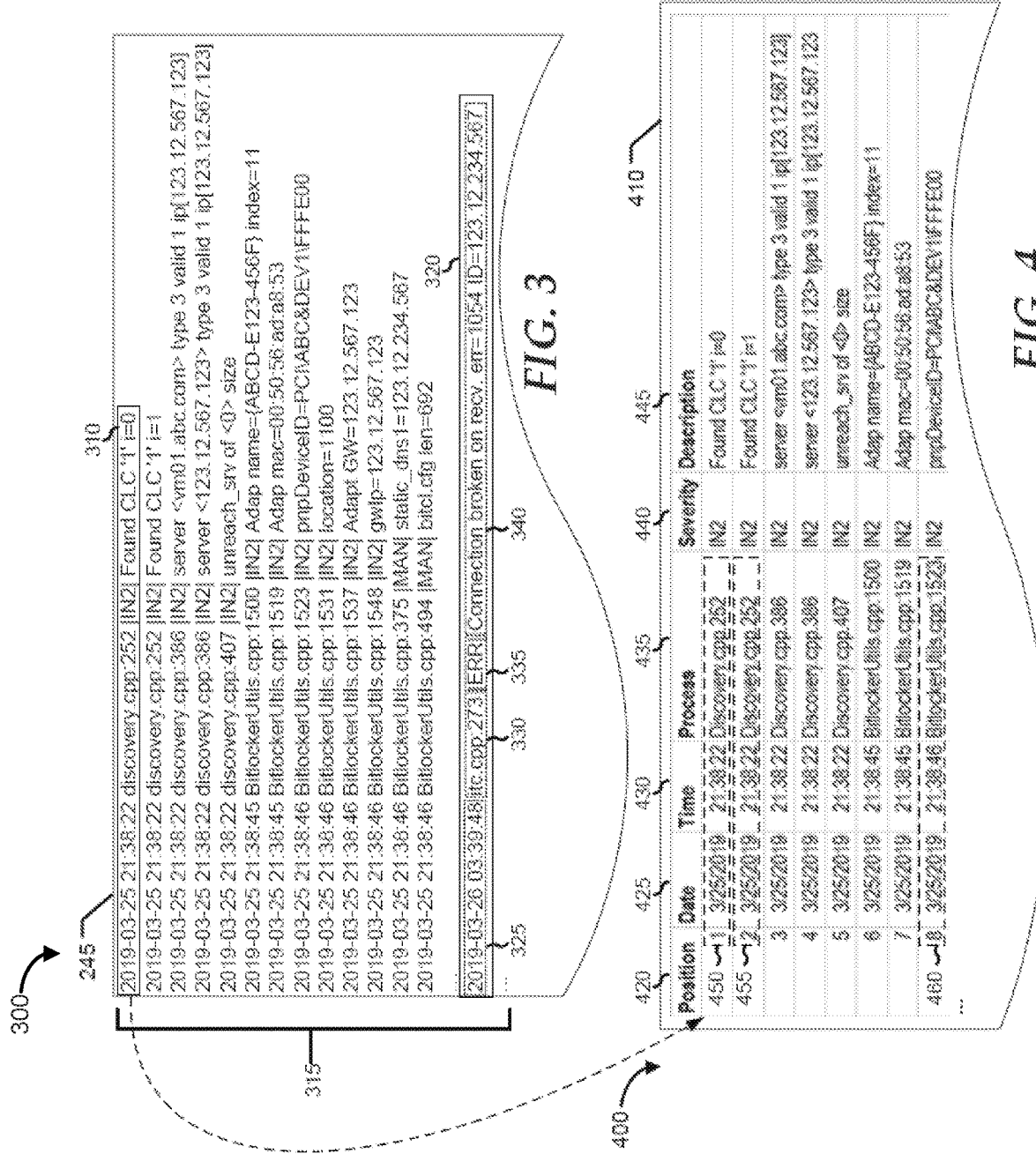

| | Count | Time Interval | Process | Message | |
|---|---|---|---|---|---|
| 545 | 14 | 39h 30m 5s | itc.cpp.273 | Connection broken vm02 error 1054 #### | 546 |
| 550 | 15 | 28h 57m 8s | BitlockerUtils.cpp.910 | Registry Action Perform key not found | 556 |
| 555 | 15 | 28h 57m 59s | UuidManager.cpp.75 | Uuid found #### | |
| 560 | 15 | 28h 57m 12s | JsonMgr.cpp.220 | BootDecryptCheck in progress | 566 |
| | 15 | 30h 46m 38s | JsonMgr.cpp.253 | Boot Decrypted - removing BEK | |
| 570 | 261 | 2h 48m 26s | BitlockerUtils.cpp.1548 | gwIP ###### | 576 |
| 575 | 262 | 2h 48m 1s | BitlockerUtils.cpp.1500 | Adap name={A8CD-E123-456F} index=11 | |
| 580 | 262 | 2h 48m 1s | BitlockerUtils.cpp.1519 | Adap mac=00.50.56.ad.a8.53 | |
| 585 | 262 | 2h 48m 1s | BitlockerUtils.cpp.1523 | pnpDeviceID=PCI\ABC&DEV1FFFE00 | |
| 590 | 262 | 2h 48m 1s | BitlockerUtils.cpp.1531 | Location=1100 | |
| | 463 | 1h 2m 57s | json.cpp.406 | {"keepAliveAck" { ip ### ###}} | 586 |
| | 995 | 1h 40m 47s | discovery.cpp.407 | unreach_srv of <0> size | 596 |
| 595 | 1593 | 0h 22m 19s | discovery.cpp.252 | Found CLC '1' i=0 | 597 |
| | 1717 | 0h 21m 43s | discovery.cpp.386 | server #### type 3 valid 1 ip #### | |

*FIG. 5*

| Count | Time Interval | Process | Message |
|---|---|---|---|
| 15 | 28h 57m 8s | BitlockerUtils.cpp.910 | Registry Action Perform key not found |
| 15 | 28h 57m 59s | UuidManager.cpp.75 | Uuid found #### |
| 15 | 28h 57m 12s | JsonMgr.cpp.220 | BootDecryptCheck in progress |
| 261 | 2h 48m 26s | BitlockerUtils.cpp.1548 | gwIP ##### |
| 262 | 2h 48m 1s | BitlockerUtils.cpp.1500 | Adap name={A8CD-E123-456F} index=11 |
| 262 | 2h 48m 1s | BitlockerUtils.cpp.1519 | Adap mac=00:50:56:ad:a8:53 |
| 262 | 2h 48m 1s | BitlockerUtils.cpp.1523 | pnpDeviceID=PCI\ABC&DEV1\FFFE00 |
| 262 | 2h 48m 1s | BitlockerUtils.cpp.1531 | Location=1100 |
| 1593 | 0h 22m 19s | discovery.cpp.252 | Found CLC '1' i=0 |
| 1717 | 0h 21m 43s | discovery.cpp.386 | server #### type 3 valid 1 ip #### |

*FIG. 6*

| Cluster | Cluster Time Interval | Sequence | Count | Time Interval | Process | Message |
|---|---|---|---|---|---|---|
| 6 | 28h 57m 12s | 1 | 15 | 28h 57m 6s | BlkkerUtils.cpp 810 | Registry Action Perform key not found |
| | | 2 | 16 | 28h 57m 12s | JsonMgr.cpp 220 | BkoDecrypt/Check in progress |
| | | 3 | 16 | 28h 57m 59s | UuidManager.cpp 75 | Uuid found ##### |
| 40 | 2h 48m 1s | 1 | 262 | 2h 48m 1s | BlkkerUtils.cpp 1500 | Adap name=(ABCD-E123-456F) index=11 |
| | | 2 | 262 | 2h 48m 1s | BlkkerUtils.cpp 1519 | Adap mac=00 50 56 ad a8 53 |
| | | 3 | 262 | 2h 48m 1s | BlkkerUtils.cpp 1523 | pnpDeviceID=PCI\A&C&DEV1\FFFED0 |
| | | 4 | 262 | 2h 48m 1s | BlkkerUtils.cpp 1531 | Location=1100 |
| | | 5 | 261 | 2h 48m 26s | BlkkerUtils.cpp 1548 | gvIP ##### |
| 60 | 0h 21m 43s | 1 | 1717 | 0h 21m 43s | discovery.cpp 386 | server ##### type 3 valid 1 ip ##### |
| | | 2 | 1693 | 0h 22m 19s | discovery.cpp 262 | Found CLC 1 r=0 |

| Number | Process | Constant and Variable Parts | | |
|---|---|---|---|---|
| 1 | BitlockerUtils.cpp.1548 | Constant | gwIP | 855 |
| | 84 | Variable | 123.12567.123 | 860 |
| 2 | itc.cpp.273 | Constant | Connection broken vm02 error 1054 | |
| | 545 | Variable | 12.12.567.124 | 865 |
| ... | | | | 870 |

| To/From | A1 | A2 | A3 | A4 |
|---|---|---|---|---|
| A1 | X | ~14 minutes | ~14 minutes | ~14 minutes |
| A2 | 2 seconds | X | ~14 minutes | ~14 minutes |
| A3 | 3 seconds | 1 second | X | ~14 minutes |
| A4 | 3.5 seconds | 1.5 seconds | 0.5 second | X |

| To/From | B1 | B2 | B3 |
|---|---|---|---|
| B1 | X | ~51 seconds | ~4 seconds |
| B2 | ~51 seconds | X | ~47 seconds |
| B3 | ~4 seconds | ~47 seconds | X |

Legend:
B1  BitlockerUtils.cpp.910
B2  UuidManager.cpp.75
B3  JsonMgr.cpp.220

SYSTEM AND METHOD FOR DETECTING ANOMALIES BY DISCOVERING SEQUENCES IN LOG ENTRIES

FIELD OF THE DISCLOSURE

The present disclosure generally relates to information handling systems, and more particularly relates to detecting anomalies by discovering sequences in log entries.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for detecting an anomaly includes retrieving a log file that includes log entries, grouping the log entries into clusters of log entry types based on number of occurrences and average time interval, and discovering a sequence of the log entry types within each of the clusters. The sequence of the log entry types is based on a shortest path from a first one of the log entry types to a last one of the log entry types.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is an exemplary log file, according to at least one embodiment of the present disclosure;

FIG. 4 is an exemplary report that shows log entries in ascending order, according to at least one embodiment of the present disclosure;

FIG. 5 is an exemplary report that shows repeated log entries in ascending order, according to at least one embodiment of the present disclosure;

FIG. 6 is an exemplary report that shows clusters of repeated log entries in ascending order, according to at least one embodiment of the present disclosure;

FIG. 7 is an exemplary report that shows discovered sequences of the repeated log entries in each cluster, according to at least one embodiment of the present disclosure;

FIG. 8 is an exemplary report of anomalies detected in the exemplary log file, according to at least one embodiment of the present disclosure;

FIG. 9 is an exemplary table of a time interval between pairs of the repeated log entries, according to at least one embodiment of the present disclosure;

FIG. 10 is an exemplary table of the time interval between the pairs of repeated log entries, according to at least one embodiment of the present disclosure;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
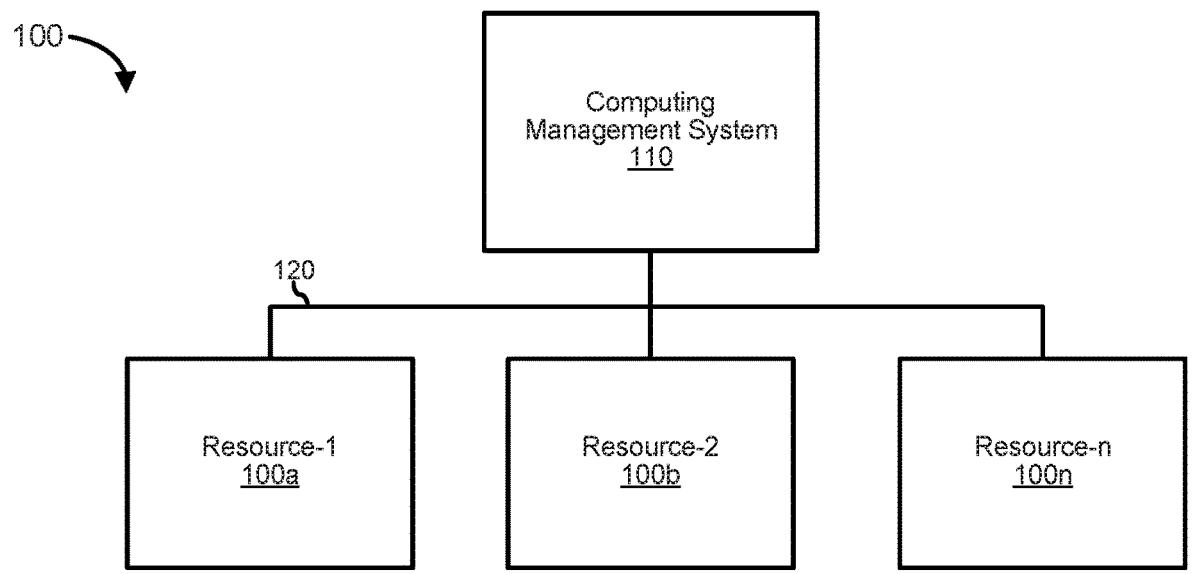
FIG. 1 is a block diagram of an exemplary computer system for analyzing log files, according to at least one embodiment of the present disclosure.

FIG. 1 shows a computer system 100 for implementing automated log analysis. In particular, automated log analysis is used for detecting anomalies by discovering sequences in log entries. Computer system 100 includes a computing management system 110 connected to information handling systems also referred to as resources 100a-100n through a communication medium 120. Other embodiments of computing management system 110 are possible and are intended to fall within the scope of the disclosure.

Computing management system 110 of FIG. 1 may contain one or more interconnected computing management systems which may be manufactured by one or more different vendors. Each of the interconnected computing management systems may be included in an embodiment of the computer system 100 of FIG. 1 to provide data logging services to, for example, resources 100a-100n that may be in the same or different geographical locations. In addition, each one of resources 100a-100n may perform different types of data operations in accordance with different tasks and applications executing on resources 100a-100n.

In this embodiment of computer system 100, computing management system 110 may manage and/or monitor resources 100a-100n for various purposes such as performance tuning and troubleshooting. For example, computing management system 110 may monitor resources 100a-100n in order to detect changes in the operational status of each of resources 100a-100n. The changes in the operational status may be determined through log messages generated by each of resources 100a-100n and then collected by computing management system 110 for analysis. Computing management system 110 is configured to access, view, parse, and analyze log files. In addition, computing management system 110 may generate a report based on the analysis. Computing management system 110 may be implemented as a single management server or a plurality of virtual or physical servers which may or may not be geographically co-located. For example, computing management system 110 and/or other aspects of computer system 100 may be hosted in a cloud-based hosting service.

Each of resources 100a-100n may be a server device such as enterprise server, application server, email server, web server, content server, application server, etc. Alternatively, resources 100-100n may be a client device such as a desktop computer, a tablet, a smartphone, etc. In some arrangements, resources 100a-100n may include both server devices and client devices. Resources 100a-100n may also include Internet-of-things (IoT) devices such as household IoT devices, commercial IoT devices, industrial IoT devices, medical IoT devices, etc. Household IoT devices include network-connected home lighting devices, thermostats, smoke detectors, alarm systems and the like. Commercial IoT devices include network-connected cash registers, vending machines, utility meters, and the like. Industrial IoT devices include gas monitors, process equipment controls, and the like. Medical IoT devices include monitors, patient communication devices, and the like. Each of resources 100a-100n may include a network interface with the capability of sending and receiving information via communication medium 120. Each of these resources may include software and/or hardware modules configured to transmit and/or receive log messages.

The communication medium 120 may use any one or more of a variety of networks or another type of communication connection as known to those skilled in the art. The type of communication connection used may vary with certain system parameters and requirements, such as those related to bandwidth and throughput required in accordance with a rate of log messages as may be generated by resources 100a-100n. The communication connection may be a network connection, bus, and/or another type of data links, such as a hardwire or other connections known in the art. For example, communication medium 120 may use the internet, an intranet, a network or other wireless or other hardwired connection(s) by which resources 100a-100n may access and communicate with computing management system 110.

Communication medium 120 may use a variety of different communication protocols such as small computer system interface (SCSI), enterprise systems connection (ESCON), Fibre Channel, internet small computer system interface (iSCSI), or Gigabit Ethernet (GigE), and the like. Some or all of the connections by which resources 100a-100n and computing management system 110 may be connected to communication medium 120 may pass through other communication devices, such as switching equipment, a phone line, a repeater, a multiplexer or even a satellite. Each of these components can be implemented with hardware and/or software, including virtual machines.

The log messages, also referred to as logs, are data generated by systems, components of systems, applications, devices, etc. that can be used to monitor its activities and to diagnose and/or troubleshoot issues. As used herein, a log message is a text string of contextual information such as an event log, a transaction log, and a message log. Event logs provide an audit trail that can be used to understand the activity of a system and to diagnose problems if any. Transaction logs record changes to stored data in a database to allow the database to recover from crashes or other data errors. The transaction logs may also be used to maintain the stored data in a consistent state. Message logs include textual communication between messaging platforms such as instant messaging (IM) programs and internet relay chat (IRC). These log messages are usually collected and written in a defined non-volatile persistent layer such as log files, databases, etc. prior to storage in a non-volatile storage device. As used herein, log entries are log messages that are written in log files.

Information handling systems generally log all events and other transactions that occur within the system, which can generate relatively large log files. As a number of applications are deployed over hundreds or thousands of virtual machines, for example, the volume of log messages generated can be extremely large and contain irrelevant or useless information. When an error occurs in an information handling system, the log files may be sent to or retrieved by support technicians that review the hundreds or thousands of log entries, which typically includes searching the log files using keywords to attempt to determine the events, transactions, etc. that may have caused the error. Due to the size of the log files, diagnosis of errors or detecting anomalies with the information handling system using its log files is difficult or tedious at best and requires a large amount of time. For example, log messages may contain noise or irrelevant data.

The disclosure addresses the problem of detecting anomalies by discovering sequences of log messages in the log files. A report that includes the discovered sequences and the detected anomalies may be generated. The discovered sequences may include a typical timing between the log messages in the sequences, a typical periods between each log message in the sequence such as during a given hour of the day or the week, and the typical count of the log messages in the sequence per hour during a given hour of the day or the week, etc. The detected anomalies may include anomalies in the typical timings, anomalies in the typical periods between each log message, anomalies in the typical count of log messages in the sequence, etc.

An unsupervised statistical analysis may be used in discovering the sequences in the log file or a set of log files. The set of log files may be from the same resource, such as the same server, virtual machine, etc. or the same computing system with more than one server, virtual machine, etc. As mentioned earlier, the statistical analysis may be used to detect anomalies in the discovered or patterns. In addition, the statistical analysis may also be used for predictive analytics or to provide quantitative data for system performance or load evaluation.

For any given condition or scenario, the log entries may have one or more different typical sequences over a time period. Deviations from these typical sequences should raise an alarm and be investigated. The deviations may include more or less than the number of sequences than the typical number of sequences for a given scenario, incomplete sequences, sequences that have extra elements such as additional log entries or additional detail in the description than in typical sequences, sequences that lack log entries or detail than in typical sequences, atypical timing between log entries in a sequence, etc.

Figure 2:
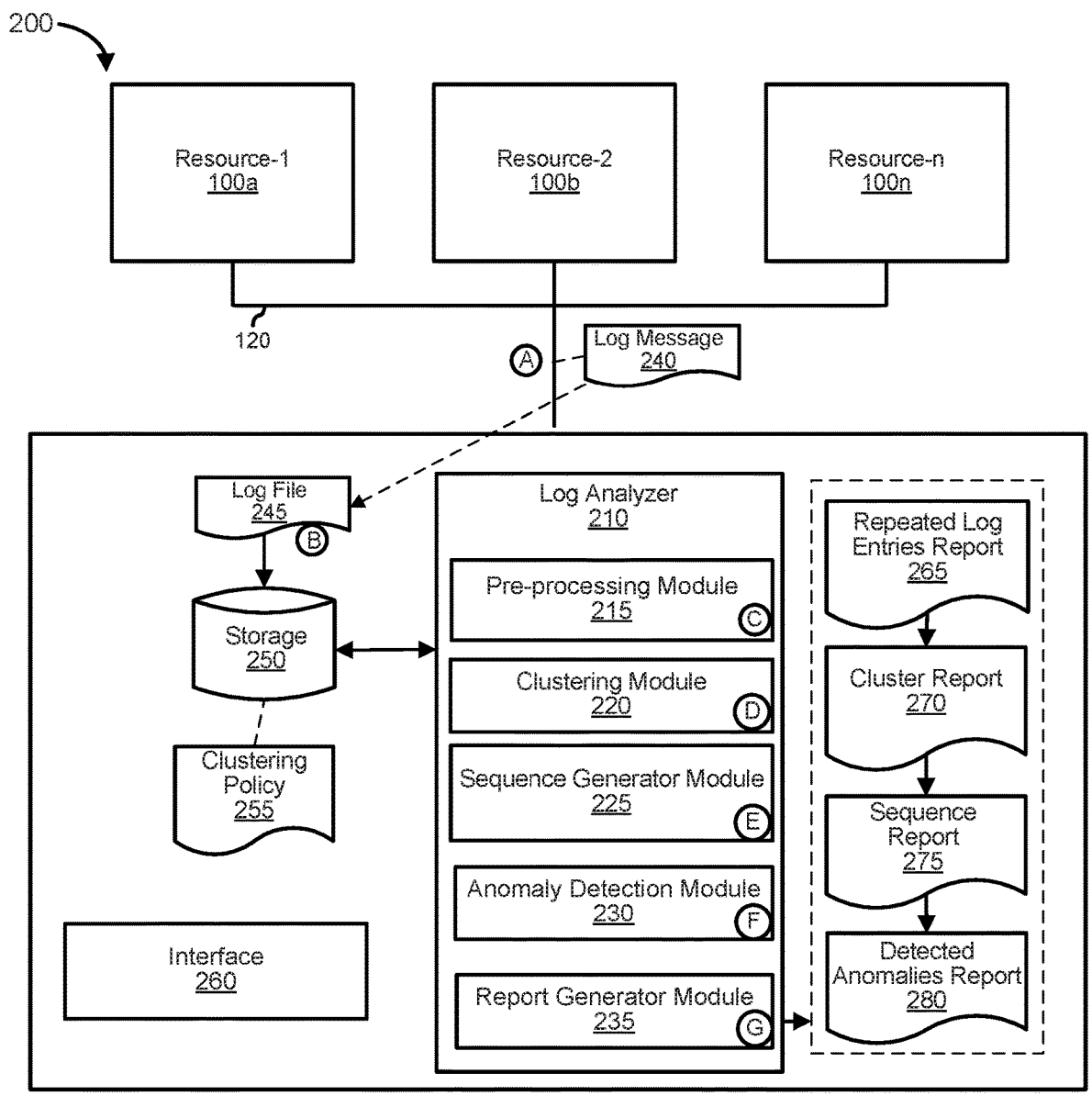
FIG. 2 is a block diagram of the computer system in greater detail, according to at least one embodiment of the present disclosure.

FIG. 2 shows computer system 100 in greater detail. Computing management system 110 includes a log analyzer 210, an interface 260, and a storage 250. Log analyzer 210 includes a pre-processing module 215, a clustering module 220, a sequence generator module 225, an anomaly detection module 230, and a report generator module 235. Storage 250 includes a log file 245 and a clustering policy 255.

Log analyzer 210 analyzes the log entries that are written in one or more log files and stored in storage 250. Log analyzer 210 uses clustering techniques, such as a two-dimensional clustering algorithm, in analyzing the log entries. Log analyzer 210 may analyze each log file individually or in correlation with other log files. Log analyzer 210 discovers sequences of the log entries in each cluster. The sequences are analyzed to detect anomalies.

Interface 260 may be used to provide configuration changes to log analyzer 210 such as to add, modify, or delete clustering rules, parameters and/or features of log analyzer 210. For example, interface 260 may modify a similarity criterion identified in a configuration file and/or environment variable file such as clustering policy 255. In addition, interface 260 can be triggered by and/or work in conjunction with other components of computing management system 110. For example, interface 260 allows users to provide configuration changes such to add, modify, or delete a log file in storage 250. Interface 260 may conform to certain architectural styles, formats and/or protocols such as representational state transfer (REST) architectural style.

Pre-processing module 215 pre-processes log files prior to clustering the log entries. Pre-processing may include parsing the log entries to clean and structure the data. Pre-processing module 215 may isolate words of interest and remove words that are not useful for distinguishing one particular log entry from another log entry. Words removed may include common words in the languages and non-significant words.

Clustering module 220 may groups the log entries into clusters according to a similarity criterion. The goal is that similar log entries belong to one cluster. Clustering module 220 may also group the log entry types into clusters according to a similarity criterion. The goal is that similar log entry types belong to one cluster. The similarity criterion may vary depending on one or more parameters set by an administrator. A different set of parameters may be used for different log files.

Sequence generator module 225 discovers sequences in the log entries or log entry types. Each cluster may have or may not have a sequence. Sequence discovery is the identification of associations or patterns in the log entries or log entry types over time. The goal is to determine a deviation or anomaly from the sequence.

Anomaly detection module 230 detects anomalies in the log entries or the log entry types. The anomaly may be based on various criteria such as a severity type. For example, log entries with severity type of emergency, alert, critical, error, and warning may be identified as an anomaly. In addition, the criteria may include the number of occurrences or the time interval. An anomaly may include a log entry or log entry type in a cluster that deviates from an attribute that is typical in the cluster or the sequence. For example, the log entry or log entry type may have a different number of occurrences than the other log entries or log entry types in the cluster. In another example, the log entry or the log entry type may have a different time interval than the other log entries or log entry types in the cluster. An anomaly may also be a deviation from a model, such as a sequence model. For example, if the sequence model is from A to B to C, and a discovered sequence is from A to C to B, then the discovered sequence is an anomaly. An anomaly may identify an error in the resource and/or computing system that generated the log message.

Report generator module 235 may generate a report based on the analysis of log analyzer 210 or its components. For example, report generator module 235 may generate a cluster report based on the analysis of clustering module 220. Report generator module 235 may store the generated report in storage 250. Storage 250 may also be used to store information to be used in the analysis such as in clustering policy 255. Storage 250 may include solid-state disks, hard disk drives, magnetic tape libraries, optical disk drives, magneto-optical disk drives, compact disk drives, compact disk arrays, disk array controllers, and/or any computer-readable medium operable to store data. Further, storage 250 may include a database or a collection of log files that is a central repository of log messages.

FIG. 2 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, a log message 240 is received by computing management system 110. Log message 240 may be stored in a cache or a log buffer. At stage B, the cache or log buffer is flushed and log message 240 is written in a log file 245. Log file 245 is then stored in a non-volatile storage device such as storage 250. Log message 240 may be formatted prior to storage. The log messages may be written to the log file in various formats, such as a text file format, an extensible markup language (XML) format, a JavaScript (JSON) format, an American standard code for information interchange (ASCII) format, etc. In another embodiment, log message 240 may be stored in one or more tables in a database.

Prior to stage C, a request to review a log file or a set of log files to determine probable anomalies may be received by log analyzer 210. The request may include a plurality of parameters such as a name of the log file, a name of a resource(s) or source of the log file, a path to where an output or report needs to be written to. The request may be initiated automatically by the resource, a user or an administrator. For example, the request may be initiated in response to a trigger such as an error detected by computing management system 110. The request may also be initiated manually via interface 260. In response to the request, log file analyzer may perform an analysis of the log file associated with the request. Thus in some embodiment, the analysis may be performed "post-mortum", that is after some time after an error occurred in a resource or computing system.

At stage C, pre-processing module 215 retrieves a log file such as log file 245 from storage 250. An illustration of log file 245 is shown in FIG. 3. Pre-processing module 215 may retrieve the log file that is associated with a certain time period, resource, or user account based on the request. In another embodiment, the log file may be transmitted to log analyzer 210 as part of the request. Further, the analysis may include an analysis of log messages still stored in the data buffer in addition to the log entries in the log file.

Pre-processing module 215 begins the pre-processing of the log entries in log file 245, such as log entries 315 shown in FIG. 3. Pre-processing includes steps, such as parsing the log entries or a portion thereof, to prepare the log entries for analysis. Parsing may include identifying various attributes of each log entry and breaking it down based on its attributes. The pre-processing may include determining the number of times a log entry has occurred or is repeated in the log file. The pre-processing may also include ordering the log entries such as by the time of occurrence, as shown in a report 400 of FIG. 4. In addition, pre-processing may also include determining the time interval or distance in time between consecutive occurrences or repetitions of the log entries or log entry types, which may also be referred to as time interval. The pre-processing module 215 may determine an average time interval, a mean time interval, a minimum time interval, a maximum time interval, and a standard deviation of the time interval. The pre-processing module 215 may direct report generator module 235 to generate repeated log entries report 265 based on the pre-processing. Repeated log entries report 265 may be passed on to clustering module 220.

At stage D, clustering module 220 groups the log entries into clusters based on a similarity metric as shown in a repeated log entries report 500 of FIG. 5, hereinafter report 500. The similarity metric is an attribute that may be used to determine how the objects are similar. Examples of similarity metrics include the number of occurrences, the time interval, the source of the log entries, the severity level of the log entries, etc. In an embodiment, clustering module 220 uses the number of occurrences and the time interval as the similarity metrics. The time interval used may be one of the average time interval, the mean time interval, the minimum time interval, the maximum time interval, or the standard deviation time interval. For example, each cluster may include log entries that have a similar number of occurrences and similar average time intervals based on a threshold. The threshold may be used to control the cluster inclusion criteria for the log entries. The maximum threshold may be 100% wherein log messages with the same values based on the similarity metric are considered part of the same cluster.

The clustering may be based on a clustering policy which includes one or more clustering rules. A clustering rule includes the similarity metric and/or the threshold that may be used to calculate occurrence values of log messages within the sub-cluster. The threshold may be plus or minus a certain percentage of the similarity metric. If the variance between the interval times is less than the threshold, the log entry is added to the current cluster. Otherwise, the method creates a new cluster for the log entry.

Assuming the threshold is 90% of the similarity metric, if N is the number of occurrences of a given log message, the cluster includes the log entries that have a similar number of occurrences within 90% of N (N*0.9, N). In another example, assuming that the threshold is within additional 10% of the similarity metric, if N is the number of occurrences of a given log message, the cluster includes log entries that have the similar number of occurrences within 110% of N (N, N*1.10). Clustering module 220 may direct report generator module 235 to generate cluster report 270. Cluster report 270 is based on the repeated log entries report 265. Cluster report 270 may be passed on to sequence generator module 225.

At stage E, sequence generator module 225 discovers a particular order or sequence of the log entries in each cluster. Prior to performing the task of discovering the sequence, sequence generator module 225 may clean up the cluster list. The clean up may also be performed by clustering module 220 prior to transmitting the cluster list to sequence generator module 225. For example, sequence generator module 225 may remove clusters which include one log entry type. A cluster report 610 shows the clusters from report 500 after the cleanup. Sequence generator module 225 may use various means such as event correlation to discover the sequence. Event correlation is a technique that relates various events, such as the log entry types to identifiable patterns. Event correlation takes log entry types included in a cluster and then analyzes the log entry types to identify relationships. In addition, there are often correlations between the log entry types. For example, repeated log entry A does not appear without repeated log entry B. Sequence generator module 225 analyzes the log entry types included in the cluster to identify the relationships and/or correlations of the log entry types to each other. Based on these relationships and/or correlations, anomaly detection may be performed. Sequence generator module 225 may direct report generator module 235 to generate sequence report 275. Sequence report 275 may be based on cluster report 270. Sequence report 275 may be passed on to anomaly detection module 230. A sequence report 710 of FIG. 7 is an example of a report that shows the identified sequences.

At stage F, anomaly detection module 230 analyzes each sequence and/or each cluster to detect an anomaly. Anomalies may be flagged and a report generated such as an anomaly report 800 of FIG. 8 for further analysis and/or review. Other actions such as sending alerts for hardware or application failures may also be performed. Anomaly detection module 230 may direct report generator module 235 to generate anomalies report 280. Anomalies report 280 may be based on sequence report 275.

At stage G, report generator module 235 may generate one or more reports associated with analyzing the log entries in log file 245. For example, report generator module 235 may generate report 400, report 500, cluster report 610, sequence report 710, and anomaly report 800. Report generator module may also generate table 900 and table 1000. Report generator module 235 may generate the aforementioned reports as the last step in the log analysis. In another embodiment, report generator module 235 may generate a report after performing a step in the log analysis. For example, report generator module 235 may be called by each of the modules of log analyzer 210 during or after performing their part in the analysis.

FIG. 3 is an example 300 that shows a portion of log file 245. Log file 245 is a raw data log resulting from a program execution in one or more of resources 100a-100n in FIG. 1. Log file 245 includes log entries 315. Some log entries may have been omitted for ease of presentation. Log entries 315 include a log entry 310 and a log entry 320. Each log entry includes one or more attributes. For example, log entry 320 includes the following attributes: a timestamp 325, a process identifier 330, a severity level 335, and a description 340.

Timestamp 325 includes a date and time of the log entry. Process identifier 330 may refer to a protocol or a module of the system software that is the source or the cause of the log entry. Severity level 335 identifies a severity level of the log entry or the log message. The log messages can be classified into different severity levels, such as informational log messages, debug log messages, warning log messages, error log messages, and alert log messages. The informational log messages are data generated during normal operation. For example, an informational log message may be generated when a user logs into a system. The debug log messages are generally generated to aid in troubleshooting and identifying problems. The warning log messages are generally generated to indicate a possible occurrence of a future problem, such as when memory space is running low. The error log messages are generated when errors or exceptions occur. For example, an error log message is generated when a hard disk fails. The alert log messages are generally related to security-related events, such as when an unauthorized user tries to log in a system.

Description 340 includes detailed information about the event or activity. The description may be divided into two parts: a constant part and a variable part. The constant part is a static text or value that has been pre-defined in the computing system. The value of the variable part changes based on what is passed by the procedure or process that transmits the log entry. In this example, the constant part may be identified as "Connection broken on recv.err=1054 ID=" and the variable part may be identified as "123.12.234.567".

Log entry 320 may include other attributes such as a log identifier, a processor identifier, etc. that are not shown. Each log entry may have a globally unique log identifier because there is a chance that more than one log message can have the same timestamp. The log identifier may be used to unambiguously refer to a single log entry. The processor identifier may refer to a hardware device or a server of the system that hosts the process of the system software.

FIG. 4 shows a portion of report 400. Report 400 provides a sorted ordering of the log entries in log file 245 based on the timestamp attribute. Report 400 includes the following columns: a position 420, a date 425, a time 430, a process 435, a severity 440, and a description 445. Report 400 may include additional rows and columns that are not shown. Because log entry 310 is the first occurring log message in log file 245 based on its timestamp, log entry 310 is the first log message in report 400 shown as log entry 450. This is followed by a second log entry 455. Log entry 450 and log entry 455 are the same log entry types because both have the same process identifier "Discovery.cpp.252" and also both log entries have the same constant parts.

FIG. 5 shows a portion of report 500. Report 500 provides a summarized report of the frequency and timing of occurrence of each distinct log entry or log entry type. As used herein, a distinct log entry is a log entry that has a unique process identifier and constant part. The distinct log entry that has occurred at least twice may also be referred to as a repeated log entry. Report 500 includes the following columns: a count 520, a time interval 525, a process 530, and a message 540. Count 520 indicates the number of times the log entries occurred or repeated in log file 245. Time interval 525 indicates the average length of time between each occurrence of the repeated log entry. Process 530 indicates the source of the repeated log entry, such as the process identifier. Message 540 indicates the description of the repeated log entry.

As shown, repeated log entry 595 of cluster 597 has a count of 1593 that means it occurred 1593 times which includes log entry 450 and log entry 455 of FIG. 4. Repeated log entry 595 has an average time interval of 22 minutes and 19 seconds between each consecutive occurrence of the repeated log entry. Log entry 450 and log entry 455 occurred less than a second apart. However, the next occurrence of the same log entry type may at least be after a log entry 460 of FIG. 4 which is at least 24 seconds later.

As shown, report 500 shows several log entry types such as a repeated log entry 545 that occurred 14 times with an average time interval of 39 hours 30 minutes and 5 seconds between each occurrence of the repeated log entry. Report 500 also shows several clusters of repeated log entries. For example, a cluster 546 includes repeated log entry 545 while cluster 556 includes repeated log entry 550, repeated log entry 555, and repeated log entry 560. As used herein, a cluster is a set of repeated log entries or log entry types with a similar number of occurrences and/or time interval within a certain threshold.

In another illustration, a cluster 576 includes a repeated log entry 570, a repeated log entry 575, a repeated log entry 580, a repeated log entry 585, and a repeated log entry 590. Cluster 576 includes log entry types that occurred 261 times. Cluster 576 also includes log entries that occurred within a threshold of minus 10% of 262 or 90% of the occurrences (262, 262*90%).

FIG. 6 is an example 600 of a portion of cluster report 610. Cluster report 610 includes cluster 556, cluster 576, and cluster 597 as shown in report 500 of FIG. 5. Similar to report 500, cluster report 610 includes the following columns: a count 620, a time interval 625, a process 630, and a message 540. During a cleanup operation, clusters that have one repeated log entry is removed. For example, the following clusters were removed from report 500: cluster 546, a cluster 566, a cluster 586, and a cluster 596. Cluster report 610 is generated after the cleanup of report 500. During the cleanup, repeated log entries of clusters with one repeated log entry that has a severity level of "error", "emergency", or "alert" may also be identified as an anomaly. For example, an anomaly flag associated with the aforementioned log entries may be set to true or 1. Clusters with a repeated log entry that has been identified as an anomaly may not be removed.

FIG. 7 is an example 700 that shows a portion of sequence report 710. Sequence report 710 includes the following columns: a cluster 720, a cluster time interval, a sequence 730, a count 735, a time interval 740, a process 745, and a message 750. Sequence report 710 includes a cluster 755, a cluster 760, and a cluster 765.

Cluster 720 shows an order identifier of each cluster in sequence report 710. For example, cluster 755 has a cluster identifier of 6 which may mean it that it's the $6^{th}$ cluster in sequence report 710. Cluster time interval 725 shows average time interval for each cluster. For example, cluster 755 includes a repeated log entry 770, a repeated log entry 772, and a repeated log entry 774. Repeated log entry 770 has a time interval of 28 hours, 57 minutes and 8 seconds. Repeated log entry 772 has a time interval of 28 hours, 57 minutes, and 12 seconds. Repeated log entry 774 has a time interval of 28 hours, 57 minutes and 59 seconds. The average time interval of the three repeated log entries is 28 hours 57 minutes and 12 seconds as shown in cluster time interval 725.

Sequence 730 shows the order identifier of each log entry in the cluster. Count 735 shows the number of occurrences of each log entry. For example, repeated log entry 770 has a sequence identifier of 1 because it's the first repeated log entry in the sequence. Time interval 740 shows the average time interval of each log entry. Process 745 shows the process identifier of the source of each log entry. Message 750 shows the description of each log entry.

Sequence report 710 shows the clusters in ascending order based on the number of occurrences. For example, cluster 755 with repeated log entries that have a count of 15 each is shown first. Generally, in certain conditions or scenarios, a resource or a set of resources in a computing system produces one or more sequences of log messages. These sequences may be of a distinct type of log messages over a certain period. The repeated log entries in cluster 755 are also ordered in sequence. As shown repeated log entry 770 with an average time interval of 28 hours, 57 minutes and 8 seconds is shown first. Repeated log entry 770 is followed by repeated log entry 772 with an average time interval of 28 hours, 57 minutes and 12 seconds. Repeated log entry 772 is followed by repeated log entry 774 with an average time interval of 28 hours 57 minutes and 59 seconds.

Repeated log entries in cluster 760 are ordered in sequence in accordance with an average time interval (or average log position distance) between pairs of log entries in the cluster as shown in FIG. 9 and FIG. 10. For example, repeated log entry 776, repeated log entry 778, repeated log entry 780, and repeated log entry 782 with an average time interval of 2 hours 48 minutes and 1 second are shown ahead of repeated log entry 784 with an average time interval of 2 hours 48 minutes and 26 seconds. Repeated log entry 775, repeated log entry 778, repeated log entry 780, and repeated log entry 782 are also ordered based on the process identifier. For example, given that both repeated log entries have the same time interval; repeated log entry 776 with the process identifier of BitlockerUtils.cpp.1500 is listed before repeated log entry 778 with the process identifier of BitlockerUtils.cpp.1519.

FIG. 8 shows a portion of an anomaly report 800. Anomaly report 800 includes the following columns: a number 820, a process 825, and a constant and variable parts 830. Anomaly report 800 also includes an anomaly 840 and an anomaly 850.

Anomaly detection aims at finding abnormal behaviors of an information handling system which may then be reported to the production staff for inspection and/or debugging. Anomaly detection includes determining a deviation from one or more criteria such as, the number of occurrences of the current repeated log entry, the time interval, an element in the repeated log entry such as missing or extra elements, a typical time period between the log entries during a given hour of the day or of day of the week, a typical number of occurrence per hour during a given hour of the day or of day of the week, etc. Anomaly detection also includes identifying log entries with a severity level above a certain threshold.

As shown in number 820, anomaly 840 is the first anomaly detected in anomaly report 800. Anomaly 840 includes repeated log entry 784 of FIG. 7 based on process identifier as shown in the column process 825. Anomaly 840 is based on an analysis of the sequence of log entries in cluster 760. As shown in cluster 760 of sequence report 710 in FIG. 7, repeated log entry 784 occurred 261 times. In comparison, the other log entries in cluster 760 occurred 262 times. As such, repeated log entry 784 is flagged as an anomaly. As shown constant and variable parts 830, anomaly 840 has a constant part 855 and a variable part 860. Variable part 860 is an internet protocol (IP) address of the resource that is the source of the repeated log entry 784.

As shown in number 820, anomaly 850 is the second anomaly detected in anomaly report 800. Anomaly 850 includes repeated log entry 545 from FIG. 5 based on process identifier as shown in the column process 825. Anomaly 850 is based on severity level 335 of log entry 320 of FIG. 3. Log entry 320 has a severity level of "ERR" or error. Log entry 320 of FIG. 3 is the same log entry type as repeated log entry 545 of FIG. 5. Anomaly 850 has a constant part 865 and a variable part 870. Variable part 870 is the IP address of the resource that is the source of the repeated log entry 545.

FIG. 9 shows a table 900. Table 900 includes rows and columns for each pair of log entries in the cluster. In determining the sequence, the average time between "adjacent" entries for all pairs of log entries is calculated. Table 900 shows the average time between each pair of log entries A1-A4. Based on these average times, a shortest path for a sequence of the log entries may be determined. For example, column 925 shows that the shortest time from the log entry A1 is 2 seconds which is from the log entry A1 to the log entry A2. Column 930 shows that the shortest time from the log entry A2 is 1 second which is from the log entry A2 to the log entry A3. Column 935 shows the shortest time from the log entry A3 is 0.5 second from the log entry A3 to the log entry A4. Column 940 shows similar times ~14 minutes from the log entry A4 to other log entries. Thus, log entry A4 is probably the last log entry in the sequence. Consequently, the sequence may be: log entry A1→log entry A2→log entry A3→log entry A4. In another embodiment, the shortest path for a sequence of the log entries may be determined over a particular time period. For example, even if the path of the current sequence does not deviate from the sequence model, but the path of the current sequence occurred over a longer period of time than the sequence model, then the current sequence may be an anomaly.

FIG. 10 shows a table 1000. Similar to table 900, table 1000 shows approximate average time between "adjacent" log entry types for all pairs of the log entry types. Column 1020 shows that the shortest time from log entry type B1 is 4 seconds which is from the log entry type B1 to log entry type B3. Column 1025 shows a negative average time from log entry type B2 to any one of the other log entry types. This means that the log entry type B2 occurs after the log entry B1 and the log entry type B2 occurs. Thus, the log entry type B2 is probably the last log entry type in the sequence. Column 1030 shows that the shortest time from the log entry B3 is 47 seconds which is from the log entry type B3 to the log entry type B2. Based on the shortest times shown above, the sequence is probably: log entry type B1→log entry type B3→log entry type B2.

Figure 11:
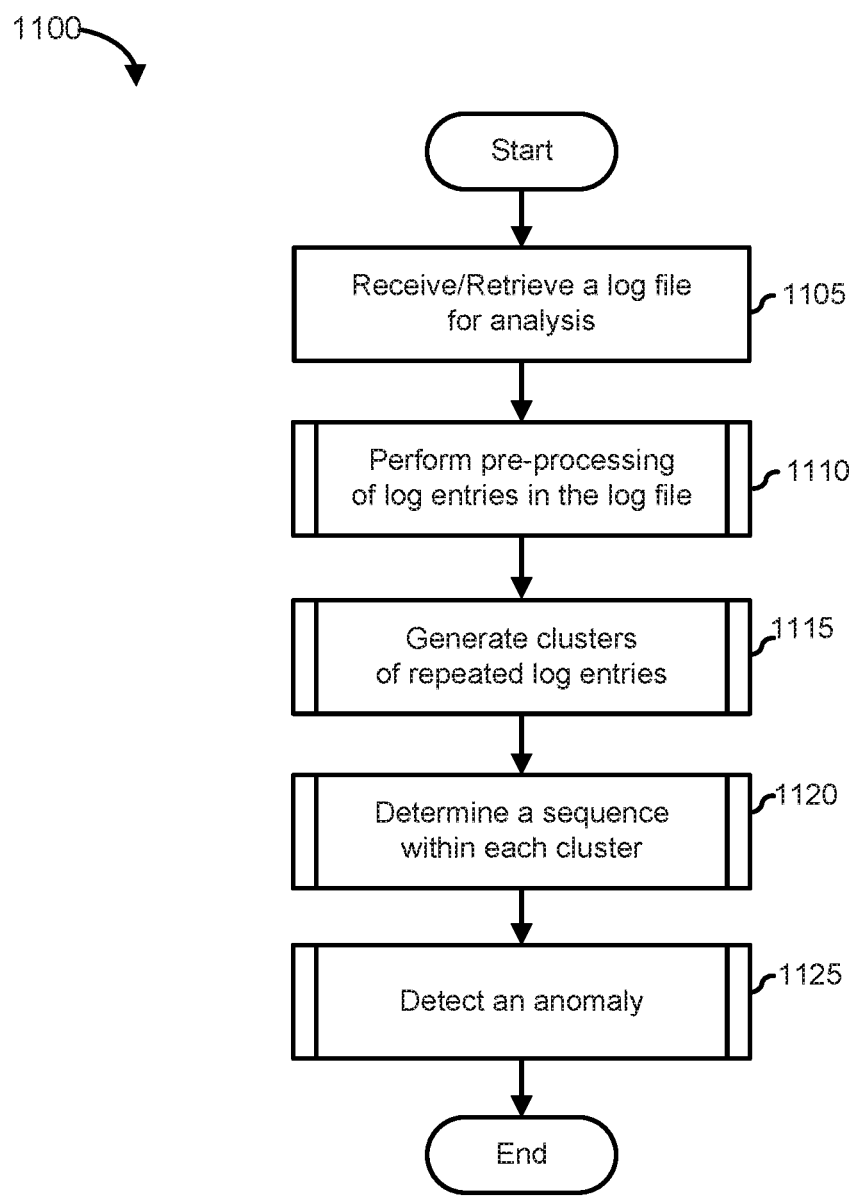
FIG. 11 is a flowchart illustrating a method for detecting anomalies by discovering sequences in the log entries, according to at least one embodiment of the present disclosure.

FIG. 11 shows a method 1100 for detecting anomalies by discovering sequences in log entry types. Method 1100 begins at block 1105 when a log file or a set of log files is retrieved or received from a storage device for analysis. As previously indicated the log entries may be from a network-based or non-network based resource. In another embodiment, the log file may be received and/or retrieved periodically through various means such as via hypertext transfer protocol (HTTP), simple object access protocol (SOAP), representational state transfer (REST), API, etc. The log file may be provided to pre-processing module 215 for pre-processing. The method proceeds to block 1110.

At block 1110 the method begins pre-processing the log file or set of log files. The pre-processing may include parsing the log entries in the log file. In addition, the log file may be cleaned by removing data that is unnecessary for the analysis. For example, data such as tags that describe the severity of the log entry, such as "info", "warn", "error", etc. may be removed. In addition, the log entries that were generated without timestamp values, such as stack traces may be separated and stored in a different log file. Parsing of the log entries includes determining the various attributes of each log entry. Parsing also includes determining the information to be used in further analysis of the log entries such as the number of occurrence of each type of log entry, the time intervals, the log entry types, etc.

Pre-processing may include normalizing the attributes of the log entries in the log file. For example, timestamps are normalized to coordinated universal time (UTC). Additionally, pre-processing may include determining a mapping between IP addresses and hosts to be able to attribute each log entries to a specific host. Pre-processing may also include ordering the log entries based on the time stamp. Pre-processing module 215 with report generator module 235 may generate a report such as report 400 of FIG. 4. The log entries may be parsed by log analyzer 210 or by pre-processing module 215 of FIG. 2. The result of the pre-processing may be provided to clustering module 220 for processing. For example, repeated log entries report 265 may be passed to clustering module 220. The method proceeds to block 1115.

At block 1115, the method may process the log entries and group the log entries into one or more clusters. The method may group the log entries based on one or more similarity metrics. In the current embodiment, the method uses the number of occurrence of log entry types and the time interval. Other attributes may be used in addition to or in lieu of the aforementioned. For example, the process identifier, the length of processing time, and the severity level may be used as a similarity metric.

Clustering algorithms includes grouping a set of objects in such a way that objects in the same group are more similar to each other than to those in other groups. In the current embodiment, clustering algorithms, such as Pearson correlation algorithm, Lloyd's algorithm, highly connected subgraphs (HCS) clustering algorithm, or the like may be used to identify and group the log entries with a degree of correlation with other log entries. Different similarity metrics may be used to identify the correlation between the log entries, such as a number of occurrences of a log entry type, an average time interval, a maximum time interval, a minimum time interval, etc.

Report 500 of FIG. 5 shows examples of clusters of log entry types in log file 245 of FIG. 2. The log entries are grouped based on the number of occurrences each log entry type. The log entries may also be grouped based on the average time interval. The log entries may also be grouped based on the maximum time interval, the minimum time interval, or the median time interval. As shown in report 500, the log entry types may be arranged in ascending occurrence from the least number of occurrences. A result such as report 500 and cluster report 270 may be provided to sequence generator module 225 for processing. The method proceeds to block 1120.

At block 1120, the method determines a sequence of the log entry types within each cluster. Prior to determining the sequences, cleanup may be performed. For example, clusters that include one log entry type may be removed. Cluster report 610 of FIG. 6 illustrates clusters based on report 500 after removing the clusters with one log entry type, such as cluster 546, cluster 566, and cluster 586. Typically log entries reflect some events or periodical activities. As such, the log entries may include repeated sequences. The sequences may not always be the same due to different processing paths and/or processing faults. The sequences may also overlap with each other. Sequence report 710 of FIG. 7 illustrates the clusters from cluster report 610 after arranging the log entries within each cluster into a sequence. A report, such as sequence report 710 may be provided to the anomaly detection module 230 for processing. The method proceeds to block 1125.

At block 1125, the method detects anomalies in the log entry types. The method may determine an anomaly in the sequences of the log entry types. For example, if the average time interval of a particular type of log entry type is different than the other log entry type, then the particular type of log entry type may be an anomaly. In addition, the method may identify a log entry type with a severity level above a pre-defined threshold as an anomaly. Anomaly report 800 of FIG. 8 is an example of an anomaly report. After detecting anomalies, the method ends.

Figure 12:
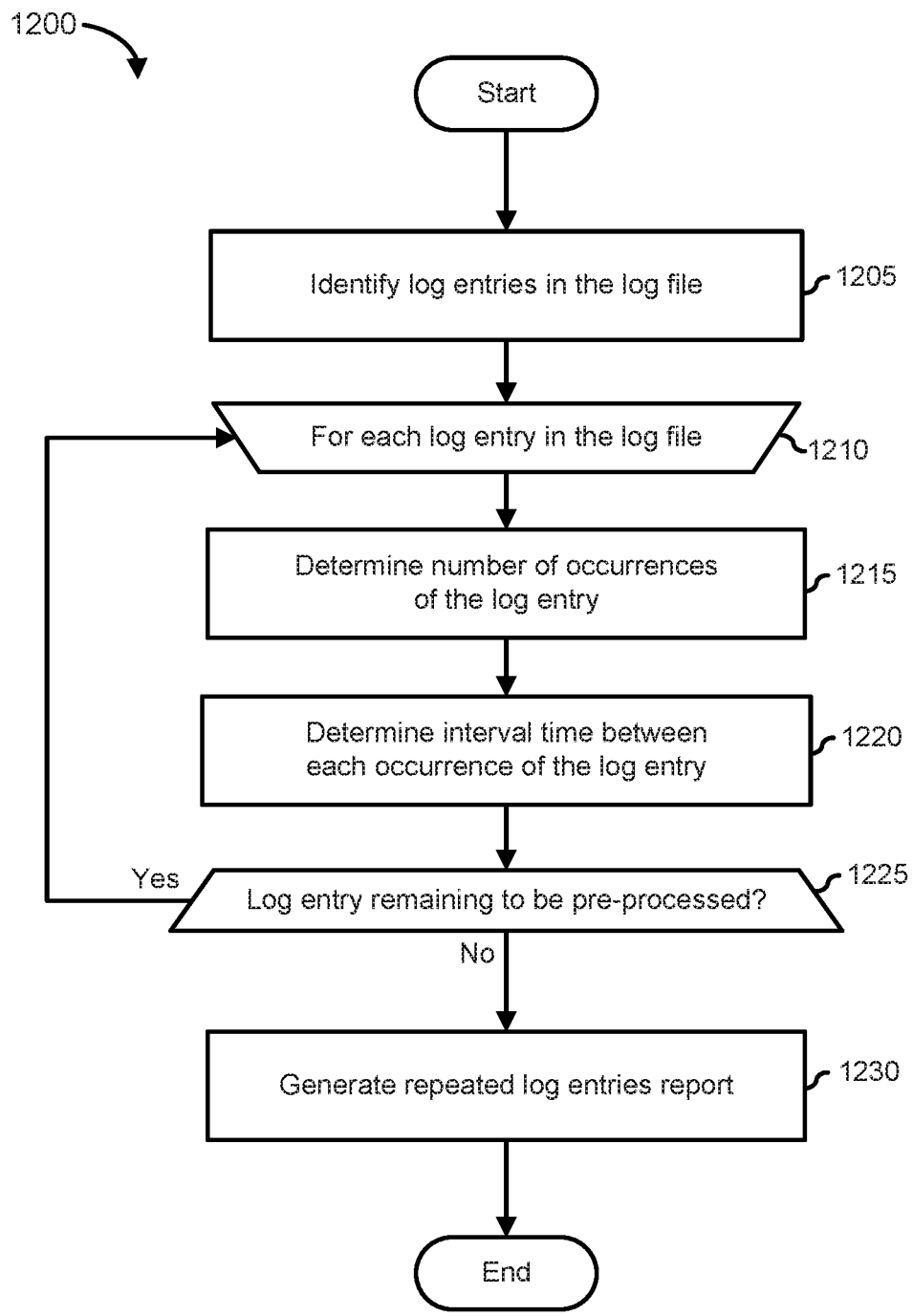
FIG. 12 is a flowchart illustrating a method for pre-processing the log entries, according to at least one embodiment of the present disclosure.

FIG. 12 shows a method 1200 for pre-processing the log entries. Method 1200 is a detailed illustration of block 1110 of FIG. 11. Method 1200 may be performed by pre-processing module 215 of FIG. 2. Method 1200 begins at block 1205. At block 1205, the method may identify the log entries in the log file. The method may also parse and identify the attributes of each log entry. For example, the method may identify the timestamp, the process identifier, the severity level, and the description of each log entry. The method may use a data structure such as a list when processing the log entries. The method may list the log entries in ascending order based on the time of its occurrence or timestamp. In order to determine the order of the log entries, the method may first parse the timestamp of each log entry. The parsing is used to determine values of the year, the month, the day, the hour, the minute, and the second that the log entry occurred. The determined values may be used to construct a date/time value of each log entry. The date/time value may be used to sort the log entries, such as in ascending or descending order based on the time of its occurrence. An order or position identifier may be assigned to each log entry to identify the position of the log entry relative to the other log entries in the list. For example, the log entry that occurred first or earliest is assigned the first position. The method may also generate a report that shows the log entries, as shown in report 400 in FIG. 4. The method proceeds to block 1210.

At block 1210, the method starts the additional pre-processing of the log entries. The log entries may be pre-processed based on the order in the list. For example, the method may traverse the list as structured. The method may also re-arrange the list based on various factors. For example, the re-arrangement may be based on the process identifier, the severity level, etc. The description will refer to the log entries being pre-processed as the current log entries. The method proceeds to block 1215.

At block 1215, the method may determine the number of occurrences of each type of log entry. The clustering operation may return several classes or groups of repeated log entries. A log entry type that has occurred at least twice may also be referred to as repeated log entry. A repeated log entry may also be referred to as a log entry type. As used herein, the log entry types are based on process identifiers. A counter may be incremented for each occurrence of each log entry type. For example, log entry type 545 occurred 14 times as shown in report 500 of FIG. 5. The method proceeds to block 1220.

At block 1220, the method determines the time interval between each occurrence of the log entries. For example, the method determines the time interval between log entry 450 and log entry 455 of FIG. 4. The method may further calculate various statistics regarding the time interval, such as an average time interval, a standard deviation in the time intervals, a minimum time interval, and a maximum time interval. The method proceeds to block 1225.

At block 1225, the method determines if there is another log entry to be pre-processed. If there is another log entry to be pre-processed, then the method proceeds to block 1210. Otherwise, the method proceeds to block 1230. At block 1230, the method generates a repeated log entries report that is similar to report 500 of FIG. 5. A log entry that occurs once in the log file may not be included in the report. After generating the report, the method ends.

Figure 13:
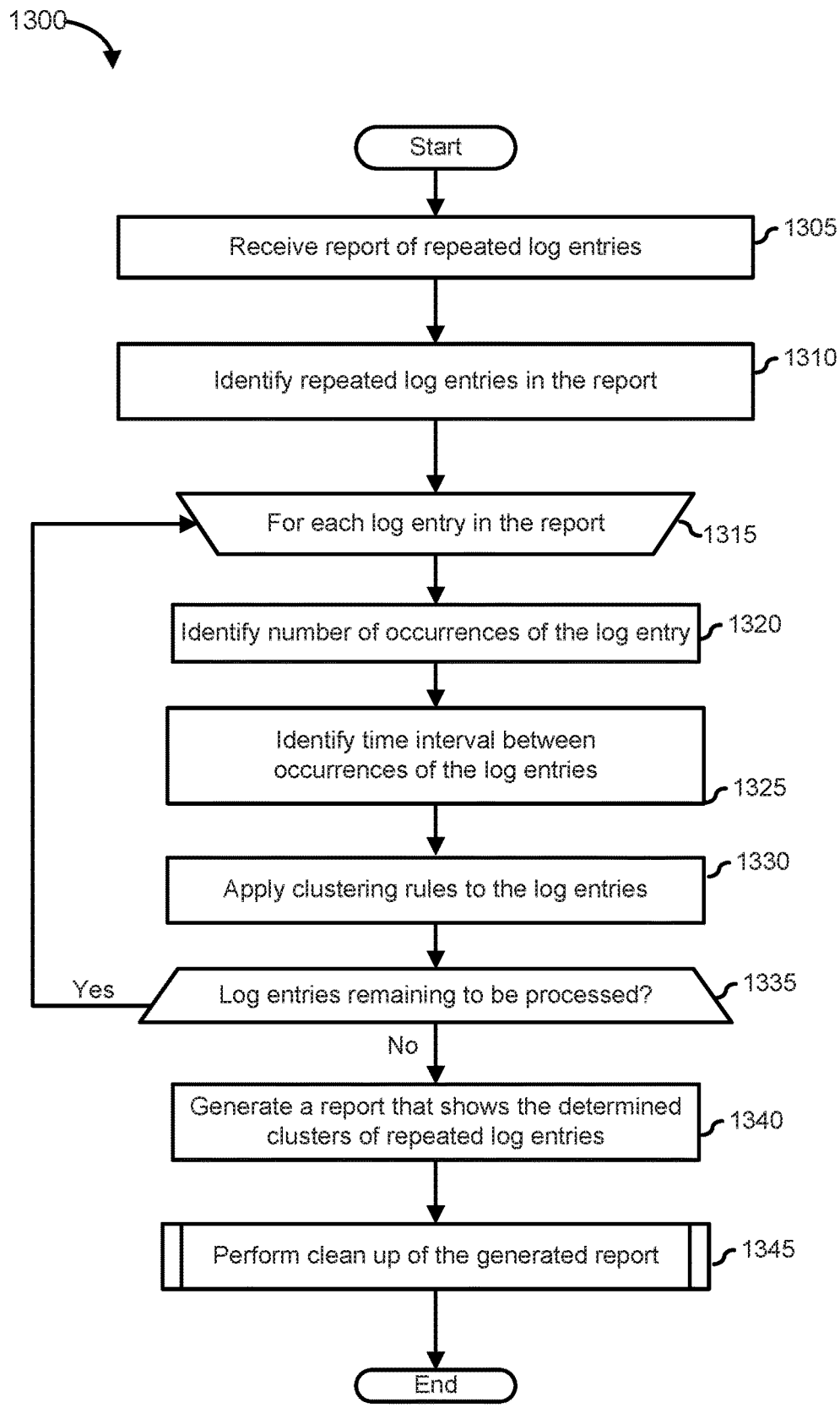
FIG. 13 is a flowchart illustrating a method for clustering the log entries, according to at least one embodiment of the present disclosure.

FIG. 13 shows a method 1300 for grouping similar log entries into clusters. Method 1300 is a detailed illustration of block 1115 of FIG. 11. Method 1300 may be performed by clustering module 220 of FIG. 2. Method 1300 begins at block 1305. At block 1305, the method receives a repeated log entries report. The report may be received from the pre-processing module 215 of FIG. 2. After receiving the report, the method proceeds to block 1310.

At block 1310, the method identifies the repeated log entries in the received report. As stated above, the report may use a data structure such as a list for the repeated log entries. The list of the repeated log entries may be ordered by the number of occurrences in ascending order. The method proceeds to block 1315.

At block 1315, the method begins processing the repeated log entries in the list. The method may process each repeated log entry based on the order in the list. For example, the method may traverse the list as structured. The method may also re-arrange the list based on various factors. For example, the re-arrangement may be based on the process identifier, the severity level, etc. The description will refer to the repeated log entry being processed as the current repeated log entry. The method proceeds to block 1320.

At block 1320, the number of occurrences of each repeated log entry is identified. For example, the report may include a column that indicates the count of the number of occurrences as illustrated in count 520 in report 500 of FIG. 5. The method then proceeds to block 1325. At block 1325, the method identifies the average time interval of the consecutive repeated log entries such as time interval 525 in report 500 of FIG. 5. The method then proceeds to block 1330.

At block 1330, a clustering algorithm is applied to the log entries. The method may use a clustering algorithm such as the K-means clustering algorithm. The clustering algorithm may include a clustering policy which includes one or more clustering rules. A clustering rule may determine sub-cluster ranges based on one or more similarity metrics. Based on the sub-cluster ranges, a log entry may be assigned to one or more sub-clusters. The main sub-cluster may be determined based on the relationships of the sub-clusters. For example, if a particular sub-cluster includes the other sub-clusters, then the particular sub-cluster may be determined to be the main sub-cluster if it includes other sub-clusters but is not included in any other sub-cluster.

An example of a clustering rule may be stated as: if N is the number of occurrences of a given repeated log entry, a sub-cluster includes all the repeated log entries that have the same number of occurrences of the given repeated log entry. In addition, the sub-cluster also includes the repeated log entries wherein the number of occurrences is within a certain threshold T of the number of occurrences. This may be referred to as a sub-cluster range <N, N*T>. For example, based on the following repeated log entries: discovery.cpp:407 occurred 895 times; discovery.cpp:252 occurred 1593 times; discovery.cpp:386 occurred 1717 times, assuming a threshold of 90%, a sub-cluster would include log entries with the number of occurrences within the sub-cluster range <1717, 1717*0.9>, which is equal to <1717, 1545>. Thus, the sub-cluster would include discovery.cpp:386 which occurred 1717 times and discovery.cpp:252 which occurred 1593 times. The sub-cluster would not include discovery.cpp:407 which occurred 895 times that is less than the threshold of 1545 times.

In another example, another set of the repeated log entries includes the following process identifiers and the number of occurrences: discovery.cpp:386 which occurred 1717 times, discovery.cpp:251 which occurred 1583 times, discovery.cpp:406 which occurred 1500 times. Assuming that the threshold is up to minus 10% of the number of occurrences, discovery.cpp:251 belongs to sub-cluster of discovery.cpp:406<1500, 1500*0.09> and sub-cluster of discovery.cpp:386<1717, 1717*0.9> in addition to its own sub-cluster of discovery.cpp:252<1593, 1593*0.9>. Thus, sub-cluster of discovery.cpp:386 includes sub-clusters of discovery.cpp:251 and sub-cluster of discovery.cpp.406. The sub-cluster of discovery.cpp.386 may be referred to as the main cluster because it includes the other sub-clusters but is not included in any other sub-cluster.

The above rule is recursive, which means that every repeated log entry has a sub-cluster range. For example, if the above set or repeated log entry also includes discovery.cpp.296 which occurred 1400 times then discovery.cpp.296 belongs to sub-cluster of discovery.cpp.406 but does not belong to the sub-cluster of discovery.cpp:251 because it occurred less than <1583, 1583*0.09>. However, because the main cluster includes sub-cluster of discovery.cpp:406, discovery.cpp.296 is also included in the main cluster being "dragged" by the sub-cluster discovery.cpp:406.

A clustering rule may also include the average time interval between the occurrences in addition to the number of occurrences of the log entry types. In this example, let's consider a log entry that occurs N times with average time interval T such as log entry (N, T), also referred to as an occurrence domain boundary. Assuming if the similarity metric is set to 90% of the average time interval, then a sub-cluster that is within the occurrence domain boundary includes log entries that occur <N, N*0.9> times. Similar to the above, a sub-cluster may include log entry types that occurred N times and within a certain threshold, which may also be referred to as time interval domain boundary. Assuming a similarity time range is set a lower boundary of a fixed time distance of 10 minutes from T, then a sub-cluster includes log entries that occur within the time interval domain boundary <T, T-10 minutes>.

In another example, let us assume that a log entry occurred M times with average time interval S. Further, let us assume a threshold of 90% is set for the number of occurrences and a threshold for the time interval is set to a lower bound of 10 minutes. Based on the above assumptions, a repeated log entry is included in the sub-cluster of log entry (N, T) if satisfies certain conditions such as those outlined below:

| Threshold | Interval |
| --- | --- |
| The log entry (M, S) falls into both the number of occurrence boundary and the time interval boundary of the log entry (N, T) | ((N >= M and M >= N*0.9) and (T >= S and S >= T - 10 mins)) |
| The log entry (M, S) falls into the number of occurrence boundary of the log entry (N, T) while the log entry (N, T) falls into the time interval boundary of the log entry (M, S) | ((N >= M and M >= N*0.9) and (S >= T and T >= S - 10 mins)) |
| The log entry (M, S) falls into the time interval boundary of log entry (N, T) while the log entry (N, T) falls into the occurrence boundary of log entry (M, S) | ((M >= N and N >= M*0.9) and (T >= S and S >= T - 10 mins)) |

Log entries that fall within the conditions outlined above are included in the sub-cluster. In addition, if the log entry (M, S) is included in the sub-cluster of the log entry (N, T), then all the log entries in the sub-cluster of the log entry (M, S) will be included in the sub-cluster of the log entry (N, T). The processing outlined above is recursive. In an extreme scenario, it is possible that all the repeated log entries in the log file may be included in one cluster. On the other hand, each repeated log entry in the log file may belong in one cluster. Changing the values in the threshold and/or the boundary in the time interval may impact the clustering results. Thus, finding the appropriate values for the occurrence domain boundary and the time interval domain boundary to determine the optimal number of clusters such that (the number of clusters)*(average number of log messages in a cluster) is maximized. After applying the clustering rules to the repeated log entries, the method proceeds to block 1335.

At block 1335, the method determines if there is another repeated log entry to be processed. If there is another repeated log entry to be processed, then the method proceeds to block 1315. Otherwise, the method proceeds to block 1340.

At block 1340, the method may generate a report that shows the clusters of repeated log entries such as report 500 as shown in FIG. 5. The method may be performed by the report generator module 230 as shown in FIG. 2. The method proceeds to block 1345. At block 1345, the method performs a cleanup or post-processing of the generated report. The cleanup may include removing clusters that include one repeated log entry. After the cleanup, the method ends.

Figure 14:
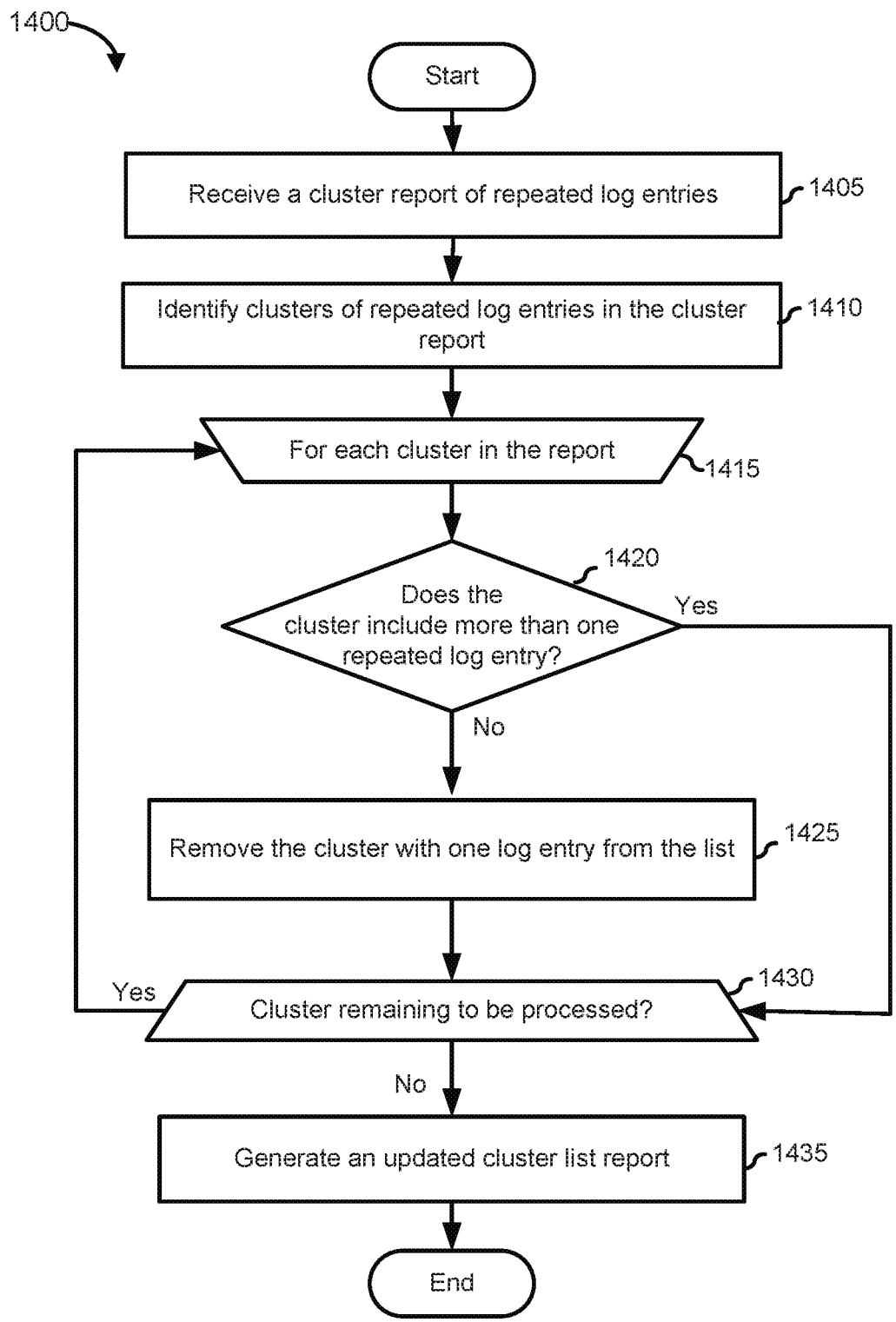
FIG. 14 is a flowchart illustrating a method for post-processing of clusters of the log entries, according to at least one embodiment of the present disclosure.

FIG. 14 shows a method 1400 for cluster evaluation and cleaning up the clusters of the repeated log entries. Method 1400 is a detailed illustration of block 1345 of FIG. 13. Method 1400 begins at block 1405. At block 1405, the method 1400 receives a cluster report. The method proceeds to block 1410.

At block 1410, the method identifies the clusters in the received report. Each cluster in the report includes one or more repeated log entries. A data structure such as a list may be used to keep track of the identified clusters. The method proceeds to block 1415.

At block 1415, each cluster may be processed based on the order in the report or the list. For example, the method may traverse the list as structured. The method may also re-arrange the list based on various factors. For example, the re-arrangement may be based on the number of the repeated log entries in the cluster, the process identifier, the severity level, etc. The cluster being processed may be referred to as the current cluster. The method proceeds to block 1420.

At block 1420, the method determines whether the current cluster includes more than one repeated log entry. If the current cluster includes more than one repeated log entry, then the method proceeds to block 1435. Otherwise, the method proceeds to block 1425.

At block 1425, the method removes the cluster with one repeated log entry from the list. After removing the cluster, the method may proceed to block 1430. At block 1430, the method determines if there is another cluster remaining to be processed. If there is another cluster remaining to be processed, the method may proceed to block 1415. Otherwise, the method may proceed to block 1435. At block 1435, the method generates an updated cluster list report. The report may be generated by the report generator module 235 of FIG. 2. The report generator module 235 may submit the report to interface 260 of FIG. 2 for display. The method ends.

Figure 15:
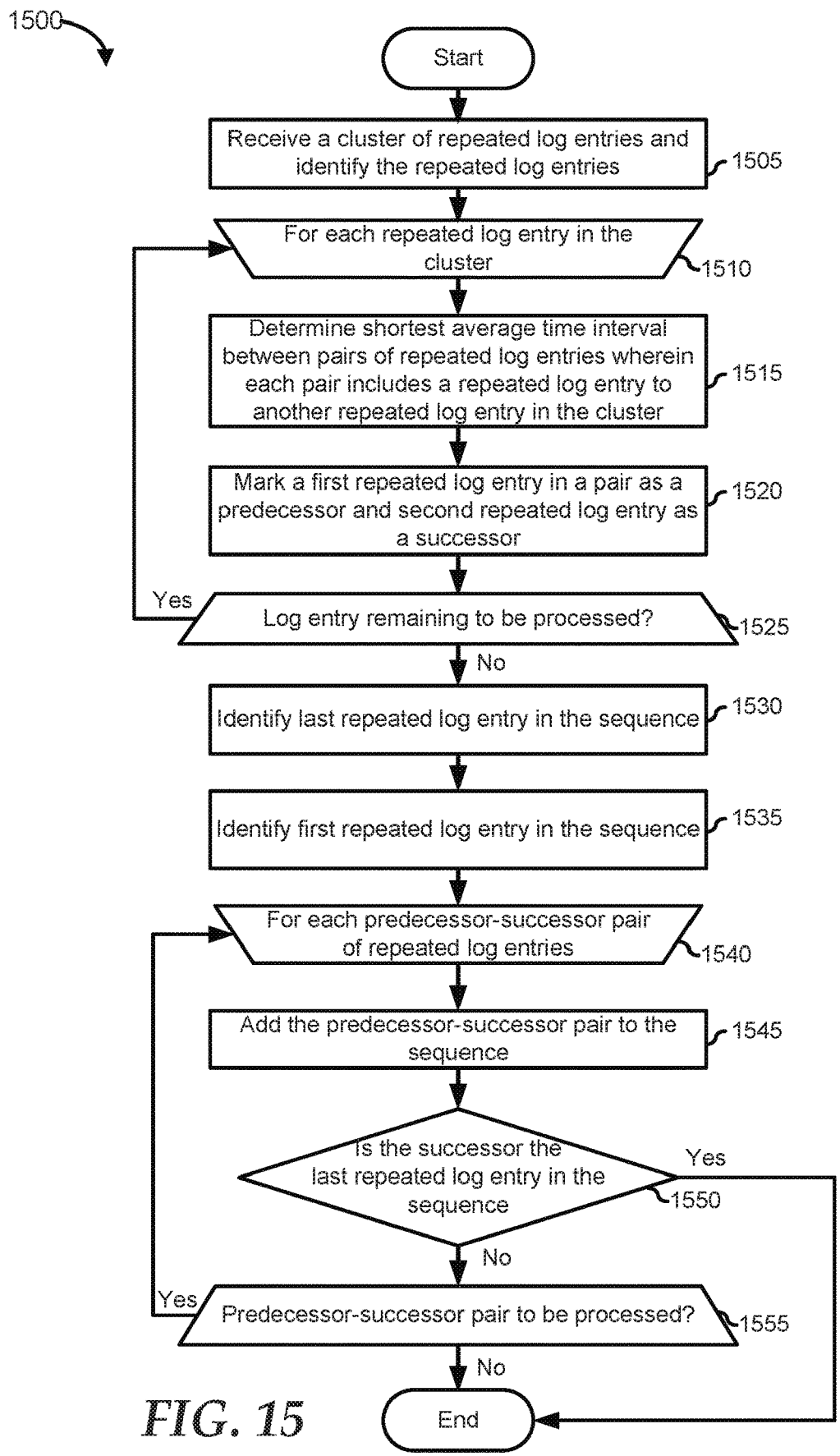
FIG. 15 is a flowchart illustrating a method for discovering sequences in the log entries, according to at least one embodiment of the present disclosure.

FIG. 15 shows a method 1500 for discovering a sequence in a cluster of log entries. Method 1500 is a detailed illustration of block 1120 of FIG. 11. Method 1500 begins at block 1505. At block 1505, the method retrieves or receives a cluster of repeated log entries. The method identifies the repeated log entries in the cluster. The method may put the repeated log entries in a list. The method proceeds to block 1510.

At block 1510, each repeated log entry in the cluster may be processed based on the order in the list. For example, the method may traverse the list as structured. The method may also re-arrange the list based on various factors. For example, the re-arrangement may be based on the time interval, a repeated log entry identifier, etc. The disclosure will refer to the repeated log entry being processed as the current repeated log entry. The method proceeds to block 1515.

At block 1515, the method determines the shortest average time interval between the current repeated log entry and other log entries in the cluster. Based on the time intervals between the current log entry and the other log entries, the method may identify the pair of repeated log entries with the shortest time interval. The shortest average time between pairs indicate the possible predecessor-successor pairs. For example, the following predecessor-successor pairs based on the shortest average time interval based on table 900 of FIG. 9 are identified as A1→A2: 2 seconds, A2→A3: 1 second, and A3→A4: 0.5 seconds. The method proceeds to block 1520.

At block 1520, the method marks the current repeated log entry as a predecessor and the other repeated log entry in the pair as a successor. Based on the above example, A1 is a predecessor and A2 is a successor. The method proceeds to block 1525. At block 1525, the method determines if there is another repeated log entry to be processed. If there is no repeated log entry to be processed, the method proceeds to block 1530. Otherwise, the method proceeds to block 1510.

At block 1530, based on the pairs of repeated log entries with the shortest average time interval, the method determines the last repeated log entry in the sequence. On a list of the shortest average time intervals between the pairs, the maximum shortest average time interval is found. The pair that has the maximum shortest time interval is identified. The predecessor of this pair is assumed to be the last repeated log entry in the sequence. The successor of this pair is assumed to be the first repeated log entry in the sequence. Based on the above example, A4 is identified as the last repeated log entry in the sequence. The method proceeds to block 1535.

At block 1535, based on the pairs of repeated log entries with the shortest average time interval, the method determines the first repeated log entry in the sequence. The first repeated log entry of the sequence is the successor of the pair that has most distant shortest average time interval. Based on the above example, A1 is identified as the first repeated last entry in the sequence.

At block 1540, each predecessor-successor pair of repeated log entries beginning with the predecessor-successor pair that includes the identified first repeated log entry is processed. The predecessor-successor pair being processed may be referred to as the current pair. The method may further set a flag to identify that the current pair is included in the sequence. The method then proceeds to block 1645.

At block 1545, the method adds the current pair to the sequence. If the current pair is the predecessor-successor pair that includes the identified first repeated log entry, then the current pair is the first predecessor-successor pair in the sequence. Otherwise, the current pair may be added to the sequence after the previous pair, wherein the predecessor of the current pair matches the successor of the previous pair. The method may use a data structure such as an array, a vector, a linked list, etc. to keep track of the predecessor-successor pairs in the sequence. The method may also set a flag to identify predecessor-successor pairs that have been included in the sequence. For example, the flag may initially be set to 0 or false before the predecessor-successor pair is added to the sequence. The flag may be set to 1 or true after the predecessor-successor pair is added to the sequence.

In another embodiment, the method considers the variable parts of the predecessor-successor pair prior to adding the predecessor-successor pair to the sequence. For example, consider table 1000 of FIG. 10, wherein based on a sequence model, log entry B1, log entry B2, and log entry B3 have variable parts V1, V2, and V3 respectively. Further, assuming V1=V2, and V2=V3, then the discovered sequence of log entry B1→log entry B3→log entry B2 is supported. A deviation from the sequence model, for example, if V3 V2, wherein V1=V2, may indicate that log entry B3 may be an anomaly. Further, the sequence model further identifies that a log entry from a different class, such as log entry A1 in table 900 of FIG. 9 is subsequent to the log entry B2 such that log entry B1→log entry B3→log entry B2→log entry A1 wherein the variable part of log entry A1 which is V4 is equal to V2. If V4 V2 then log entry A1 may be an anomaly.

After adding the predecessor-successor pair to the sequence, the flag may then be set to 1 or true. After adding the current pair to the sequence, the current pair is identified as the previous pair. The identifier of the last previous pair is removed. The method proceeds to block 1550.

At block 1550, the method determines if the successor in the current pair is the last repeated log entry. If the successor in the current pair is the last repeated log entry then current pair is the last predecessor-successor pair in the sequence and the method ends. Otherwise, the method proceeds to block 1555.

At block 1555, the method scans the other predecessor-successor pairs to determine if there is a predecessor-successor pair with a predecessor that is a match of the successor of the current pair. If the method finds the predecessor-successor pair during the scan, then the method may also determine if the predecessor-successor pair is available. A predecessor-successor pair is available if it has not been included in the sequence. If the predecessor-successor pair is available, then the method proceeds to block 1540. Otherwise, the method ends.

Figure 16:
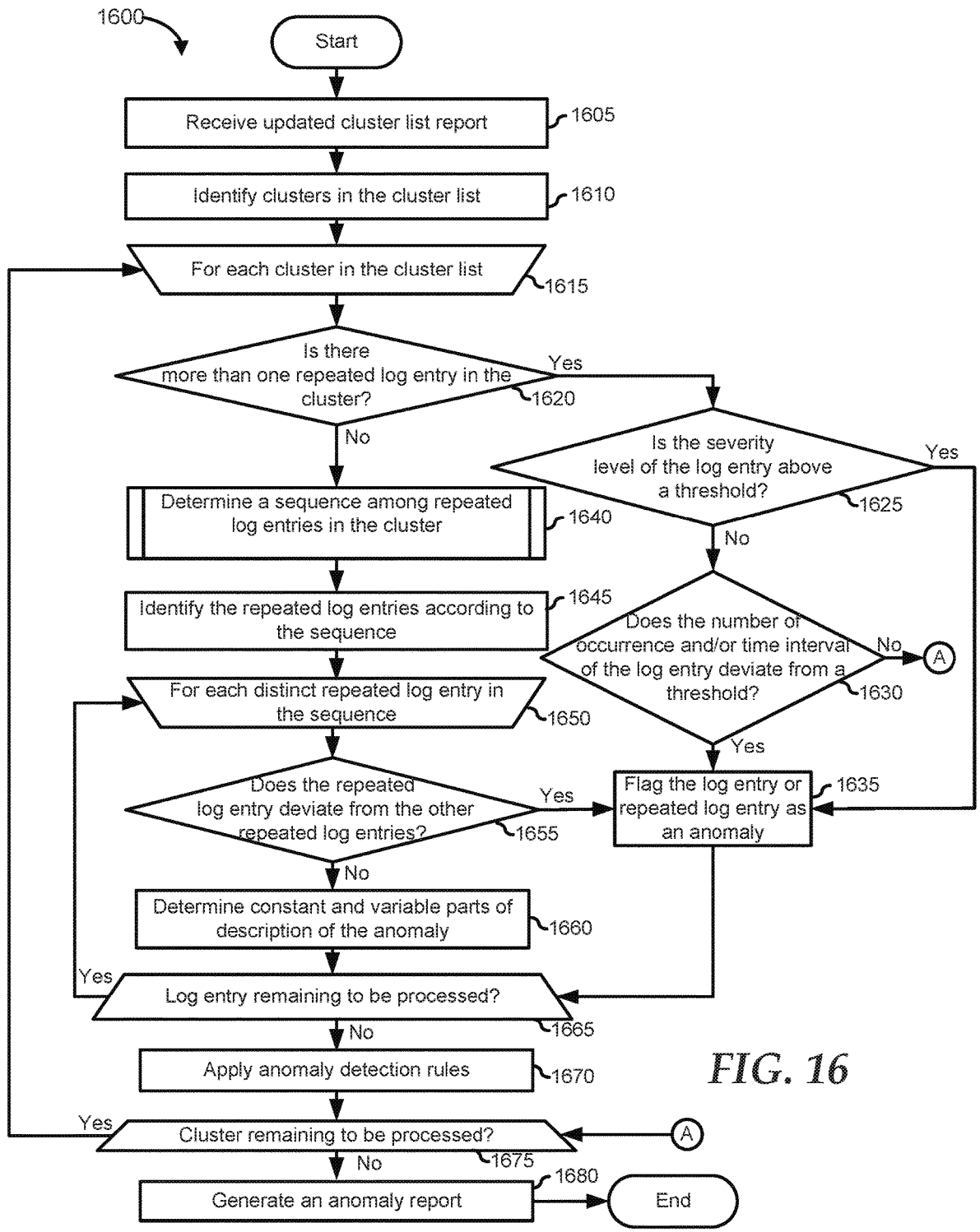
FIG. 16 is a flowchart illustrating a method for detecting anomalies in the log entries, according to at least one embodiment of the present disclosure.

FIG. 16 shows a method 1600 for anomaly detection. Method 1600 is a detailed illustration of block 1125 of FIG. 11. Method 1600 begins at block 1605. At block 1605, the method receives the updated cluster list report. The updated cluster list report may be received from the report generator module 235 of FIG. 2. In another embodiment, the method retrieves the updated cluster list report. The method proceeds to block 1610. At block 1610, the method identifies the clusters in the report. The method may use a data structure such as a list to store the identified clusters. The method proceeds to block 1615.

At block 1615, each cluster may be processed based on the order in the list. For example, the method may traverse the list as structured. The method may also re-arrange the list based on various factors. For example, the re-arrangement may be based on the number of the repeated log entries in the cluster, the process identifier, the severity level, etc. The disclosure will refer to the cluster being processed as the current cluster. The method proceeds to block 1620.

At block 1620, the method determines if there is more than one repeated log entry in the current cluster. If there is more than one repeated log entry in the current cluster, then the method proceeds to block 1625. Otherwise, the method proceeds to block 1640. At block 1625, the method determines whether the severity level of the repeated log entry is above a threshold. If the severity level of the repeated log entry is above the threshold, then the method proceeds to block 1630. Otherwise, the method proceeds to block 1635. At block 1635, the method sets a flag to identify that the current repeated log entry is an anomaly. The method proceeds to block 1665.

At block 1640, the method discovers a sequence among the repeated log entries in the current cluster. As used herein, sequence discovery is the identification of association or pattern of the repeated log entries. In other words, a sequence is an ordered series of the repeated log entries. The sequence may be used to identify patterns in the behavior of the computing system. Sequences may be based on various features or parameters. In particular, the sequence may be time-based, wherein a first repeated log entry occurs before a second repeated log entry. For example, the sequence may be based on the number of occurrences as well as the time interval between each occurrence of the repeated log entry.

As used herein, the main objective of clustering is to group repeated log entries into classes or categories according to shared qualities or characteristics. Each class may include one or more repeated log entries. For example, a repeated log entry with a distinct process identifier may be identified as a type of log entry. Various algorithms may be used, such as generalize sequential patterns (GSP), sequential pattern discovery using equivalent classes (SPADE), and prefix-projected sequential pattern growth (PrefixSpan). In order to discover the sequence of the repeated log entries, the average time between adjacent repeated log entries for all pairs of repeated log entries in the class may be calculated, as illustrated in table 1000 of FIG. 10. The calculated average times are analyzed to determine the sequence. The method proceeds to block 1645.

At block 1645, the method identifies the repeated log entries in the sequence. The method may also put the repeated log entries in a list. The method proceeds to block 1650. At block 1650, the method begins processing each repeated log entry in the sequence. The method may process each repeated log entry according to the order in the sequence. The method may also process each repeated log entry according to the list. The repeated log entry being processed may be referred to as a current repeated log entry. The method proceeds to block 1655.

At block 1655, the method determines if the current repeated log entry deviates from the other repeated log entries. The current repeated log entry may deviate from the other repeated log entries based on one or more criteria. For example, the number of occurrences of the current repeated log entry, the time interval, an element in the log entry such as missing or extra elements, typical time period between the log entries during a given hour of the day or of day of the week, typical number of occurrence per hour during a given hour of the day or of day of the week, etc. For example, the method may compare the number of occurrences of the current repeated log entry with the number of occurrences of the other repeated log entries. Based on the comparison, the method may determine if the number or occurrences of the current repeated log entry deviates with the number of occurrences of the other repeated log entries. The method may also compare the time interval of the current repeated log entry with the time interval of the other repeated log entries. Based on the comparison, the method may determine if the time interval of the current repeated log entry deviates with the time interval of the other repeated log entries. If the repeated log entry deviates from the other repeated log entries in the sequence, then the method proceeds to block 1635. Otherwise, the method proceeds to block 1660.

At block 1660, the method analyzes the description of the log entry. As part of the analysis, the method may parse the description of the log entry. The description may include a constant part or a constant part and a variable part. The method determines the constant and the variable part of the description of the current repeated log entry. A constant part is a constant string that reveals the template of the log entry and remains the same for every occurrence of the log message. The variable part is a value based on runtime information which may vary among different occurrences of the log entry. The goal of this block is to convert each description of the anomalous repeated log entry into a specific template and its associated parameter. Various tools and techniques such as regular expressions and grok patterns may be used to extract the templates and the parameters. For example, message 750 of repeated log entry 784 of FIG. 7 shows "gwIP ####", which is a template for the log entry. "####" is a place holder for the IP address of the source of the log entry. Anomaly 840 of FIG. 8 shows repeated log entry 784 after the determination of its constant and variable parts, that is constant part 855 and variable part 860 based on message 750. In another example, anomaly 850 of FIG. 8 shows the constant part 865 and variable part 870 of message 540 of log entry type 545 of FIG. 5. The method proceeds to block 1665.

At block 1665, the method determines if there is a repeated log entry remaining to be processed. If there is a repeated log entry remaining to be processed, the method proceeds to block 1650. If there is no repeated log message remaining to be processed, the method proceeds to block 1670.

At block 1670, the method applies anomaly detection rules. The detection rules may be applied to the updated cluster list or the cluster list before the cleanup and/or update. The detection rules may also be applied to repeated log entries report prior to the clustering process. The anomaly detection rules are used to detect anomalies such as incomplete sequences, sequences with extra elements, sequences with missing elements, unusual timing of sequences, increased number of sequences than typical, increased number of clusters than typical, decreased number of clusters than typical, increased size of clusters than typical, decreased size of clusters than typical, change in the order of log entries in a cluster, change in the time intervals of the log entries, change in the number of bytes transmitted or received, etc. The anomaly detection rules may compare the current clusters, the sequences, and/or the log entries to a model, such as a cluster model or a sequence model to detect a deviation. The model may have been determined during a baseline operation of the computing system. The method proceeds to block 1675. At block 1675, the method determines if there is a cluster remaining to be processed. If there is a cluster remaining to be processed, the method proceeds to block 1615. Otherwise, the method proceeds to block 1680.

At block 1680, the method generates an anomaly report. The anomaly report may include the constant and variable parts of the anomalous log entries, as illustrated in anomaly report 800 of FIG. 8. After generating the anomaly report, the method ends.

Figure 17:
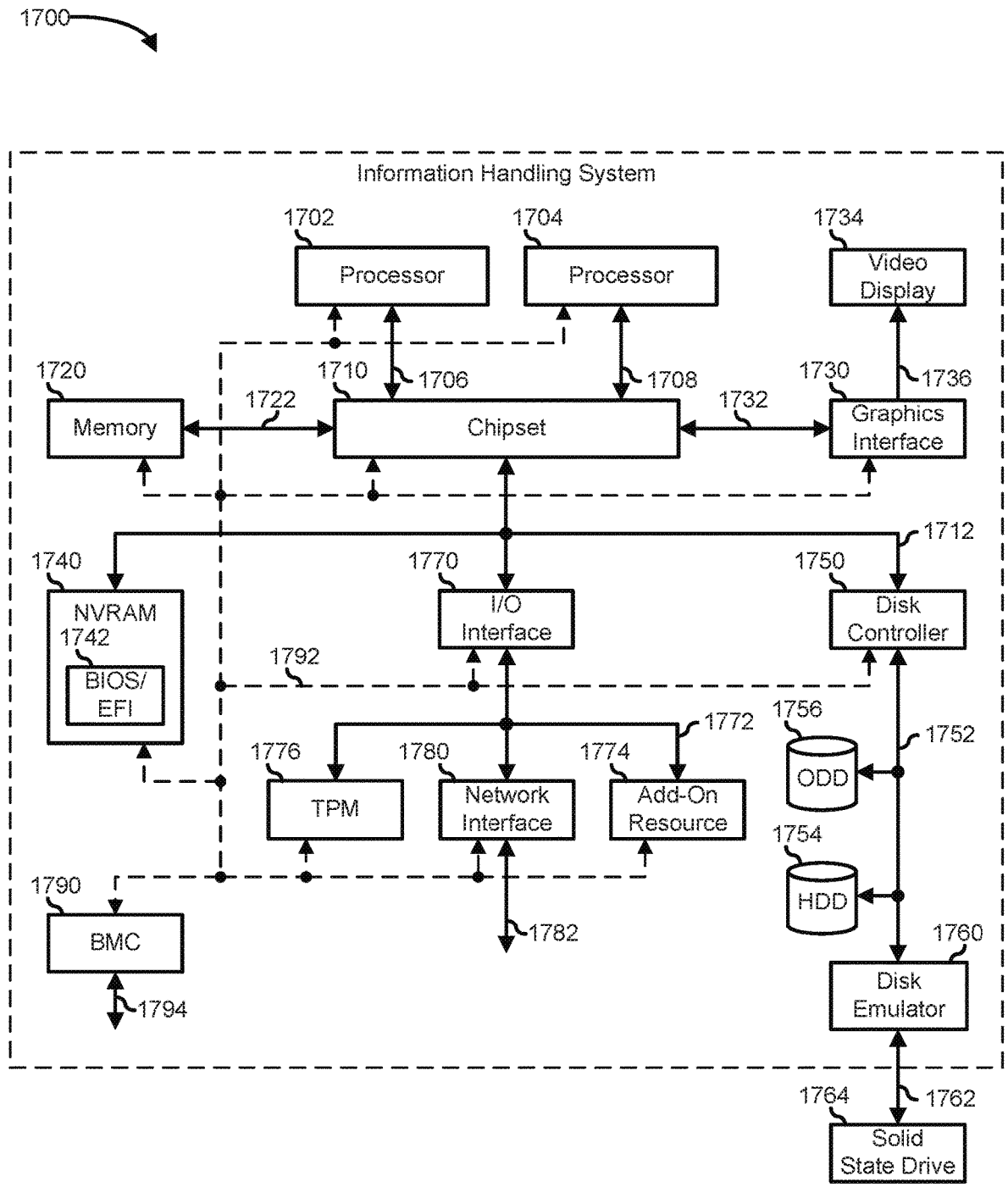
FIG. 17 is a block diagram of a general information handling system, according to an embodiment of the present disclosure.

FIG. 17 illustrates an embodiment of an information handling system 1700 including processors 1702 and 1704, a chipset 1710, a memory 1720, a graphics adapter 1730 connected to a video display 1734, a non-volatile RAM (NV-RAM) 1740 that includes a basic input and output system/extensible firmware interface (BIOS/EFI) module 1742, a disk controller 1750, a hard disk drive (HDD) 1754, an optical disk drive 1756, a disk emulator 1760 connected to a solid-state drive (SSD) 1764, an input/output (I/O) interface 1770 connected to an add-on resource 1774 and a trusted platform module (TPM) 1776, a network interface 1780, and a baseboard management controller (BMC) 1790. Processor 1702 is connected to chipset 1710 via processor interface 1706, and processor 1704 is connected to the chipset via processor interface 1708. In a particular embodiment, processors 1702 and 1704 are connected together via a high-capacity coherent fabric, such as a HyperTransport link, a QuickPath Interconnect, or the like. Chipset 1710 represents an integrated circuit or group of integrated circuits that manage the data flow between processors 1702 and 1704 and the other elements of information handling system 1700. In a particular embodiment, chipset 1710 represents a pair of integrated circuits, such as a northbridge component and a southbridge component. In another embodiment, some or all of the functions and features of chipset 1710 are integrated with one or more of processors 1702 and 1704.

Memory 1720 is connected to chipset 1710 via a memory interface 1722. An example of memory interface 1722 includes a Double Data Rate (DDR) memory channel and memory 1720 represents one or more DDR Dual In-Line Memory Modules (DIMMs). In a particular embodiment, memory interface 1722 represents two or more DDR channels. In another embodiment, one or more of processors 1702 and 1704 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 1720 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 1730 is connected to chipset 1710 via a graphics interface 1732 and provides a video display output 1736 to a video display 1734. An example of a graphics interface 1732 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 1730 is provided down on a system printed circuit board (PCB). Video display output 1736 can include a Digital Video Interface (DVI), a High-Definition Multimedia Interface (HDMI), a DisplayPort interface, or the like, and video display 1734 can include a monitor, a smart television, an embedded display such as a laptop computer display, or the like.

NV-RAM 1740, disk controller 1750, and I/O interface 1770 are connected to chipset 1710 via an I/O channel 1712. An example of I/O channel 1712 includes one or more point-to-point PCIe links between chipset 1710 and each of NV-RAM 1740, disk controller 1750, and I/O interface 1770. Chipset 1710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 1740 includes BIOS/EFI module 1742 that stores machine-executable code (BIOS/EFI code) that operates to detect the resources of information handling system 1700, to provide drivers for the resources, to initialize the resources, and to provide common access mechanisms for the resources. The functions and features of BIOS/EFI module 1742 will be further described below.

Disk controller 1750 includes a disk interface 1752 that connects the disc controller to a hard disk drive (HDD) 1754, to an optical disk drive (ODD) 1756, and to disk emulator 1760. An example of disk interface 1752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1760 permits SSD 1764 to be connected to information handling system 1700 via an external interface 1762. An example of external interface 1762 includes a USB interface, an IEEE 1394 (Firewire) interface, a proprietary interface, or a combination thereof. Alternatively, SSD 1764 can be disposed within information handling system 1700.

I/O interface 1770 includes a peripheral interface 1772 that connects the I/O interface to add-on resource 1774, to TPM 1776, and to network interface 1780. Peripheral interface 1772 can be the same type of interface as I/O channel 1712 or can be a different type of interface. As such, I/O interface 1770 extends the capacity of I/O channel 1712 when peripheral interface 1772 and the I/O channel are of the same type, and the I/O interface translates information from a format suitable to the I/O channel to a format suitable to the peripheral interface 172 when they are of a different type. Add-on resource 1774 can include a data storage system, an additional graphics interface, a network interface card (NIC), a sound/video processing card, another add-on resource, or a combination thereof. Add-on resource 1774 can be on a main circuit board, on separate circuit board or add-in card disposed within information handling system 1700, a device that is external to the information handling system, or a combination thereof.

Network interface 1780 represents a network communication device disposed within information handling system 1700, on a main circuit board of the information handling system, integrated onto another component such as chipset 1710, in another suitable location, or a combination thereof. Network interface 1780 includes a network channel 1782 that provides an interface to devices that are external to information handling system 1700. In a particular embodiment, network channel 1782 is of a different type than peripheral interface 1772 and network interface 1780 translates information from a format suitable to the peripheral channel to a format suitable to external devices. In a particular embodiment, network interface 1780 includes a NIC or host bus adapter (HBA), and an example of network channel 1782 includes an InfiniBand channel, a Fibre Channel, a Gigabit Ethernet channel, proprietary channel architecture, or a combination thereof. In another embodiment, network interface 1780 includes a wireless communication interface, and network channel 1782 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 1782 can be connected to an external network resource (not illustrated). The network resource can include another information handling system, a data storage system, another network, a grid management system, another suitable resource, or a combination thereof.

BMC 1790 is connected to multiple elements of information handling system 1700 via one or more management interface 1792 to provide out of band monitoring, maintenance, and control of the elements of the information handling system. As such, BMC 1790 represents a processing device different from processor 1702 and processor 1704, which provides various management functions for information handling system 1700. For example, BMC 1790 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 1790 can vary considerably based on the type of information handling system. BMC 190 can operate in accordance with an Intelligent Platform Management Interface (IPMI). Examples of BMC 1790 include an Integrated Dell Remote Access Controller (iDRAC).

Management interface 1792 represents one or more out-of-band communication interfaces between BMC 1790 and the elements of information handling system 1700, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 1700, that is apart from the execution of code by processors 1702 and 1704 and procedures that are implemented on the information handling system in response to the executed code. BMC 1790 operates to monitor and maintain system firmware, such as code stored in BIOS/EFI module 1742, option ROMs for graphics adapter 1730, disk controller 1750, add-on resource 1774, network interface 1780, or other elements of information handling system 1700, as needed or desired. In particular, BMC 1790 includes a network interface 1794 that can be connected to a remote management system to receive firmware updates, as needed or desired. Here, BMC 1790 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 1790 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 1790 is included on a main circuit board (such as a baseboard, a motherboard, or any combination thereof) of information handling system 1700, or is integrated onto another element of the information handling system such as chipset 1710, or another suitable element, as needed or desired. As such, BMC 1790 can be part of an integrated circuit or a chipset within information handling system 1700. An example of BMC 1790 includes an integrated Dell remote access controller (iDRAC), or the like. BMC 1790 may operate on a separate power plane from other resources in information handling system 1700. Thus BMC 1790 can communicate with the management system via network interface 1794 while the resources of information handling system 1700 are powered off. Here, information can be sent from the management system to BMC 1790 and the information can be stored in a RAM or NV-RAM associated with the BMC. Information stored in the RAM may be lost after power-down of the power plane for BMC 1790, while information stored in the NV-RAM may be saved through a power-down/power-up cycle of the power plane for the BMC.

In the flow diagrams of FIGS. 11-17, each block represents one or more operation that can be implemented in hardware, software, or a combination thereof. In addition, each block or a portion thereof may be performed by one or more suitable components of the system described above in relation to FIG. 1 and FIG. 2. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein. Also, the term "user" in this context and elsewhere herein is intended to be more broadly construed so as to encompass, for example, human, hardware, software or firmware entities, as well as various combinations of such entities. An operation described herein as being performed by a user may, therefore, for example, be performed by a user device, a person utilizing or otherwise associated with the device, or by a combination of both the person and the device. Similarly, the information described as being associated with a user may, for example, be associated with a person utilizing or otherwise associated with the device, or a combination of both the person and the device.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for detecting an anomaly, the method comprising:

in response to detecting an error, retrieving, by a processor, a log file that includes a plurality of log entries based on a request initiated by the error;

analyzing the log file in correlation with other log files, wherein the analyzing includes:

grouping the log entries into clusters of log entry types based on number of occurrences of the log entry types, wherein the clusters include a sub-cluster of pairs of log entry types that have same number of occurrences;

removing a cluster without a repeated log entry, wherein the repeated log entry is a log entry type that occurs at least twice in the cluster;

determining occurrences of the pairs of the log entry types and time intervals between the occurrences of the pairs of the log entry types;

determining a shortest average time interval for each pair of the log entry types based on the time intervals;

determining a sequence of distinct log entry types in each of the clusters of the log entry types, wherein the sequence of the distinct log entry types is based on a shortest path between the distinct log entry types, wherein the shortest path is based on the shortest average time interval; and determining a deviation in the sequence to detect the anomaly by comparing the sequence to a baseline sequence model that is generated during a baseline operation of an information handling system, wherein the anomaly includes the deviation in number of bytes transmitted or number of bytes received from the baseline sequence model; and sending an alert for a hardware failure based on the anomaly.

2. The method of claim 1, further comprising determining a constant part and a variable part of a description attribute of a particular log entry type.

3. The method of claim 2, wherein the sequence is further based on the variable part of the particular log entry type.

4. The method of claim 1, further comprising sending an alert.

5. The method of claim 1, wherein the deviation is further based on correlations between the distinct log entry types.

6. The method of claim 1, wherein the deviation is based on the shortest average time interval.

7. The method of claim 1, wherein the pairs of the log entry types in the clusters of the log entry types are similar in the occurrences of the log entry types and average time interval.

8. The method of claim 1, wherein each pair of the log entry types includes a predecessor log entry type and a successor log entry type.

9. The method of claim 1, further comprising determining a sub-cluster according to a sub-cluster range based on a first similarity metric and a second similarity metric.

10. The method of claim 9, wherein the sub-cluster range includes a first threshold associated with the first similarity metric.

11. The method of claim 10, wherein the sub-cluster range further includes a second threshold associated with the second similarity metric.

12. A computing system for detecting an anomaly, the computing system comprising:
a memory to store a log file that includes a plurality of log entries; and
a processing device to communicate with the memory, the processing device configured to:
in response to detecting an error, retrieving the log file based on a request initiated by the error;
analyzing the log file in correlation with other log files, wherein the analyzing includes:
group the log entries into clusters of log entry types based on number of occurrences of the log entry types;
remove a cluster without a repeated log entry, wherein the repeated log entry is a log entry type that occurs at least twice in the cluster;

determine occurrences of pairs of the log entry types and time intervals between the occurrences of the pairs of the log entry types;

determine a shortest average time interval for each pair of the log entry types based on the time intervals;

determine a sequence of distinct log entry types in each one of the clusters of the log entry types, wherein the sequence of the distinct log entry types is based on a shortest path between the distinct log entry types, wherein the shortest path is based on the shortest average time interval; and determine a deviation in the sequence to detect the anomaly by comparing the sequence to a baseline sequence model that is generated during a baseline operation of an information handling system, wherein the anomaly includes the deviation in number of bytes transmitted or number of bytes received from the baseline sequence model; and sending an alert for an application failure based on the anomaly.

13. The computing system of claim 12, wherein the sequence is based on the shortest path between the pairs of the distinct log entry types in a particular time period.

14. A non-transitory computer-readable medium including code for performing a method, the method comprising:
in response to detecting an error, retrieving a log file that includes a plurality of log entries based on a request initiated by the error;
analyzing the log file in correlation with other log files, wherein the analyzing includes:
grouping the log entries into clusters of log entry types based on number of occurrences of the log entry types, wherein the clusters include a sub-cluster of pairs of log entry types that have the same number of occurrences;

removing a cluster without a repeated log entry, wherein the repeated log entry is a log entry type that occurs at least twice in the cluster;

determining occurrences of the pairs of the log entry types and time intervals between the occurrences of the pairs of the log entry types;

determining a shortest average time interval for each pair of the log entry types based on the time intervals;

discovering a sequence of distinct log entry types in each one of the clusters, wherein the sequence is based on a shortest path between the distinct log entry types, wherein the shortest path of the distinct log entry types is based on the shortest average time interval; and detecting a deviation in the sequence to determine an anomaly by comparing the sequence to a baseline sequence model that is generated during a baseline operation of an information handling system, wherein the anomaly includes the deviation in number of bytes transmitted or number of bytes received from the baseline sequence model; and sending an alert for a hardware failure based on the anomaly.

15. The non-transitory computer-readable medium of claim 14, wherein the time intervals between the occurrences of the pairs of the log entry types are minimum time intervals.

16. The non-transitory computer-readable medium of claim 14, wherein the time intervals between the occurrences of the pairs of the log entry types are maximum time intervals.

17. The non-transitory computer-readable medium of claim 14, wherein the time intervals between the occurrences of the pairs the log entry types are median time intervals.

* * * * *